Feb. 27, 1968   E. N. ADAMS   3,371,321
TUTORIAL SYSTEM
Filed April 15, 1965   11 Sheets-Sheet 1
FIG. 1
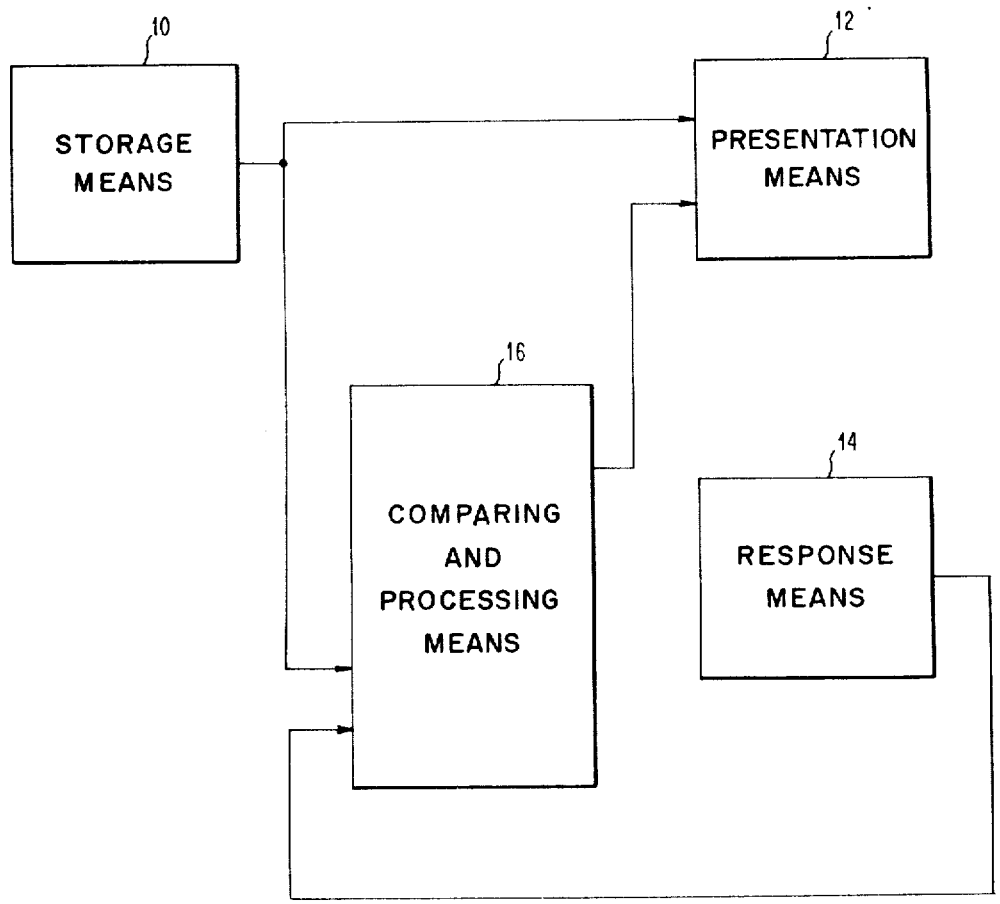
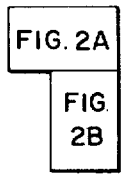
FIG. 2
INVENTOR.
EDWARD N. ADAMS
BY John J. Goodwin
ATTORNEY

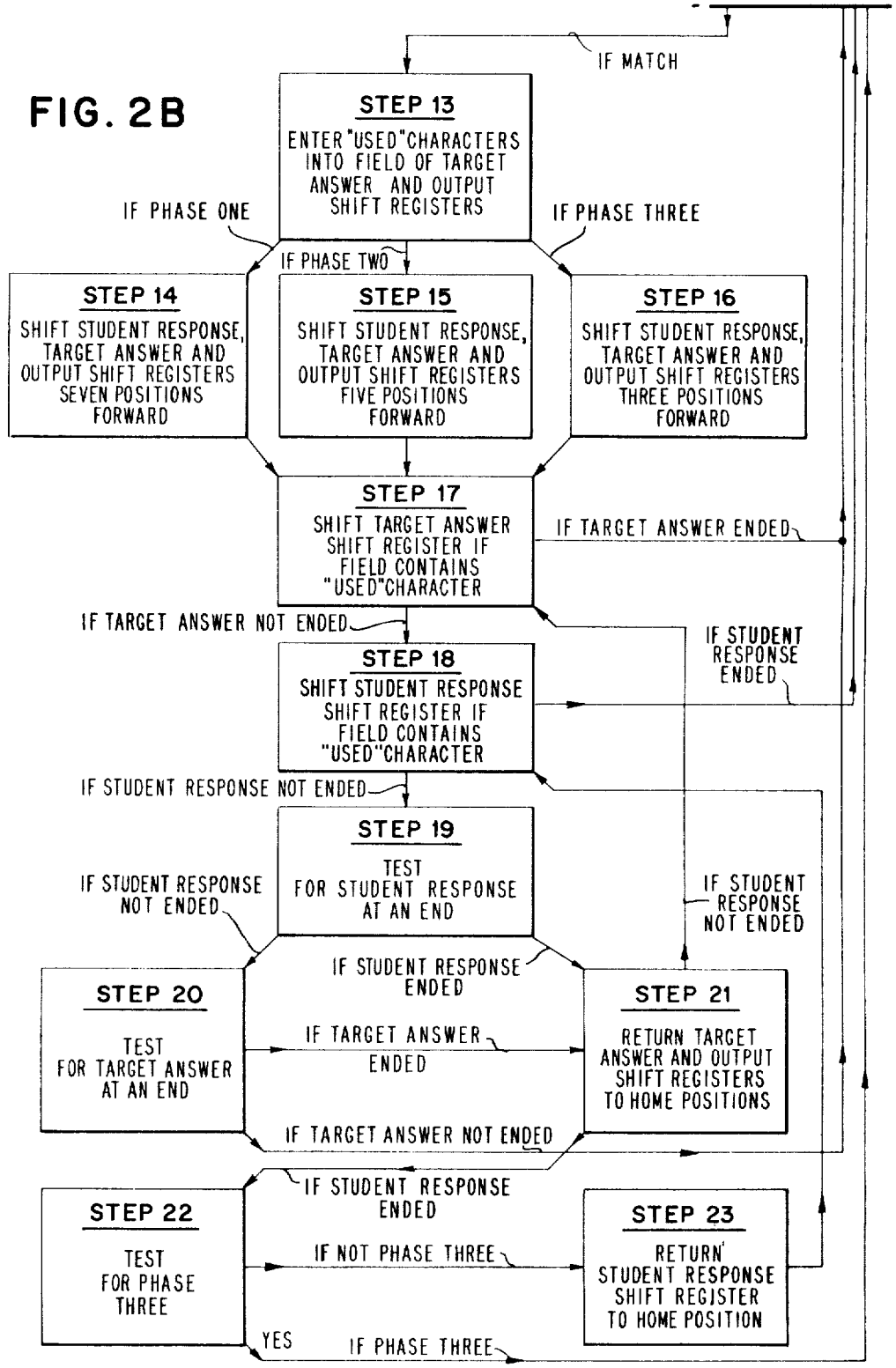

Feb. 27, 1968        E. N. ADAMS                3,371,321
                    TUTORIAL SYSTEM
Filed April 15, 1965                    11 Sheets-Sheet 4

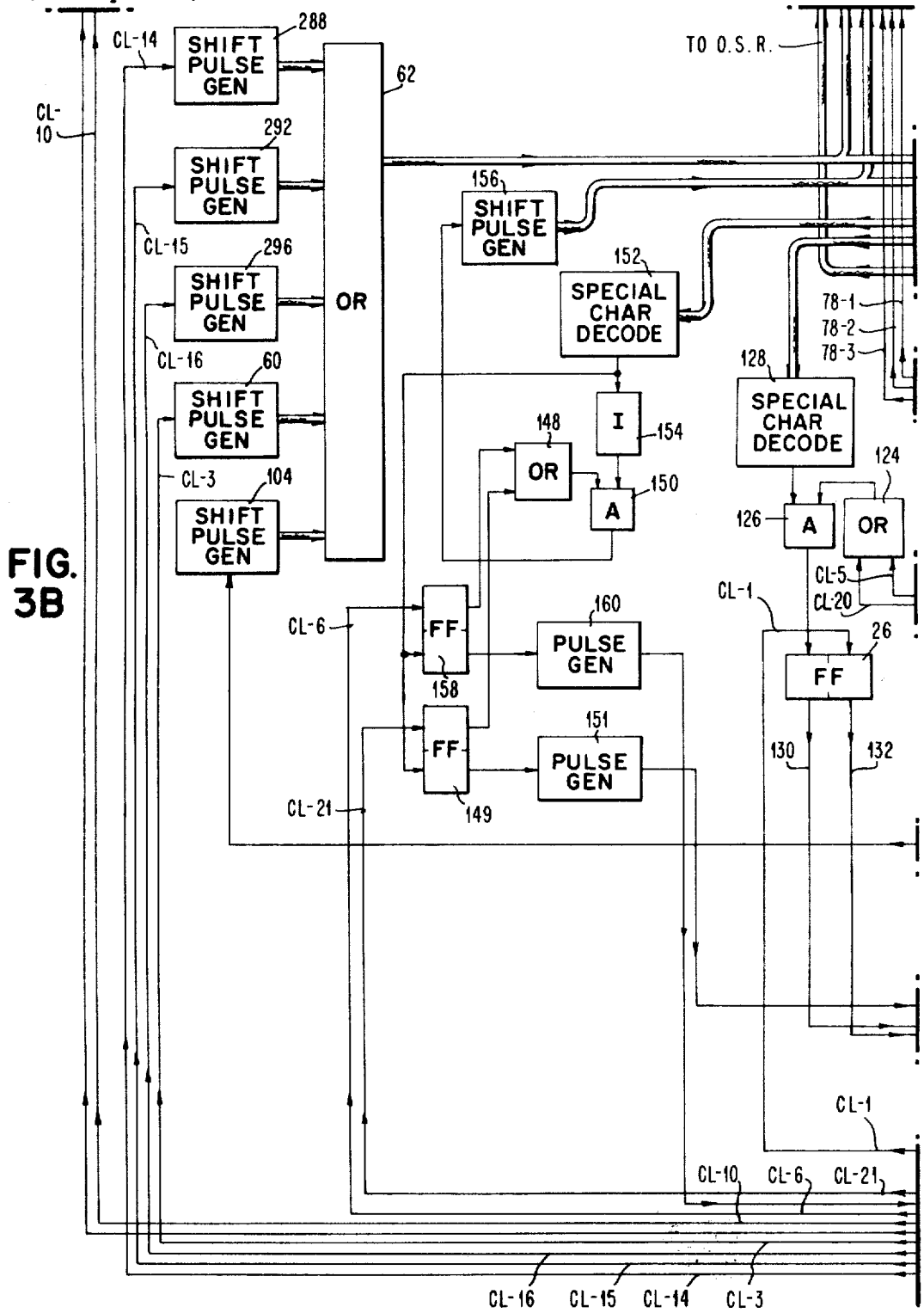

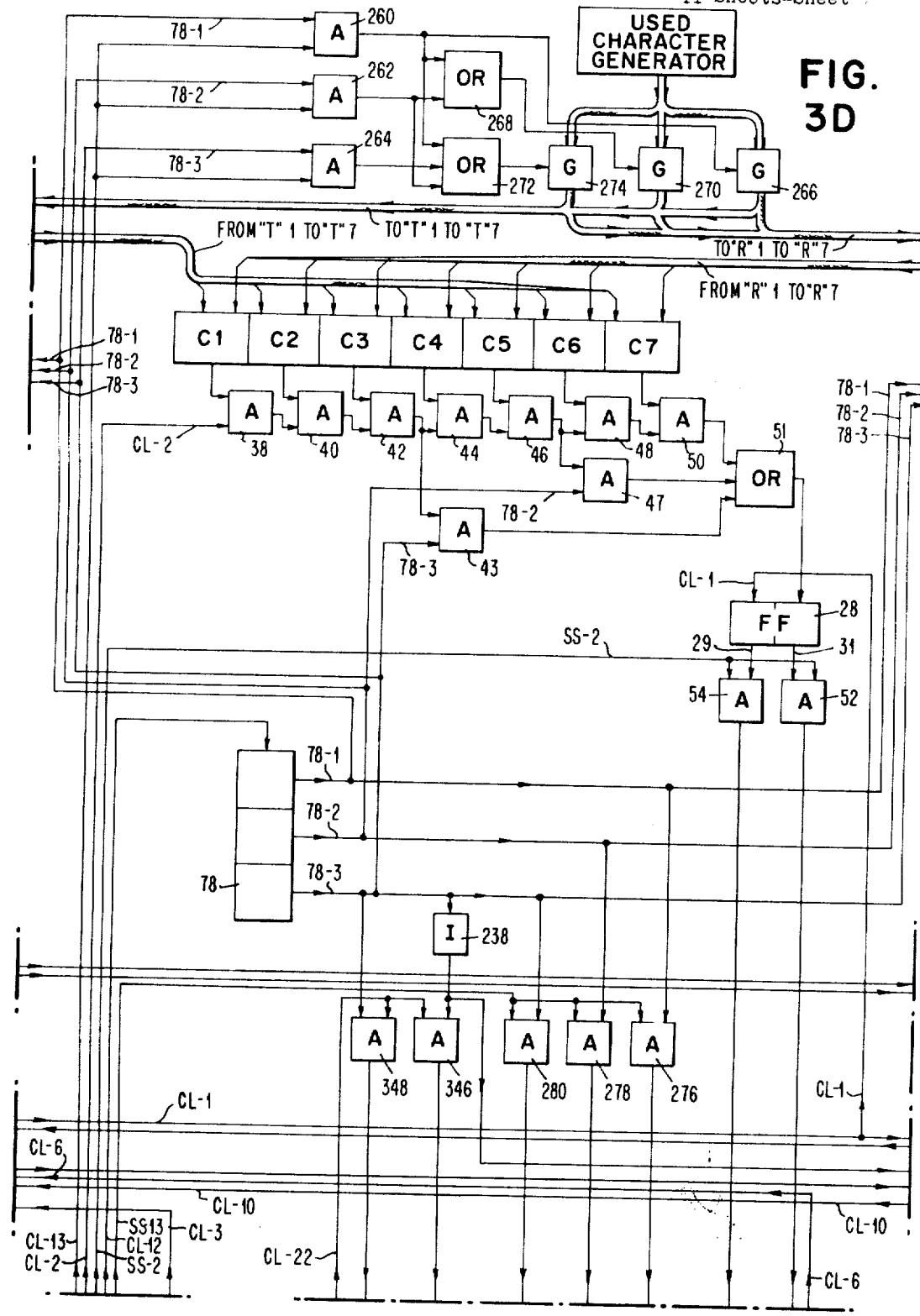

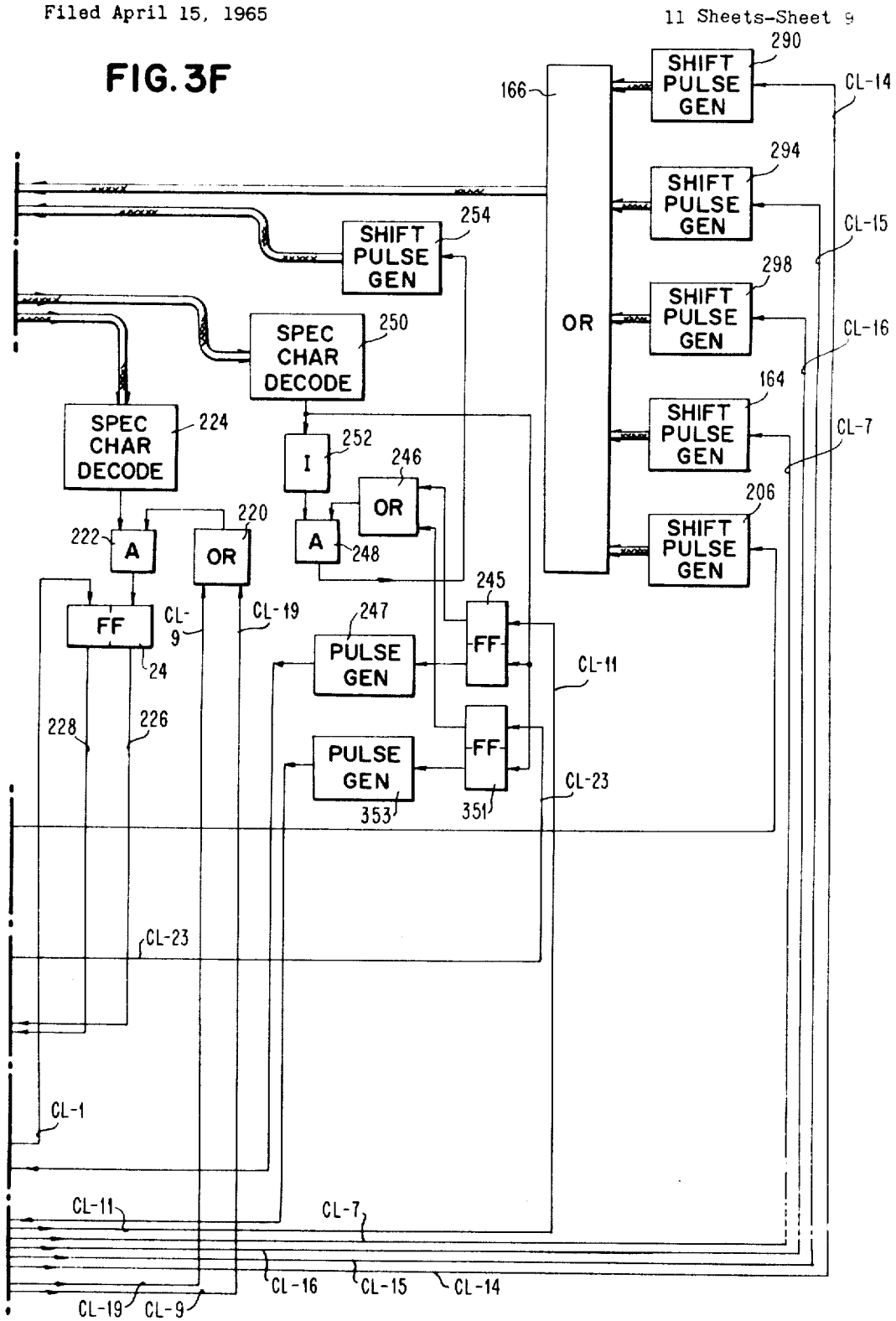

United States Patent Office 3,371,321
Patented Feb. 27, 1968

3,371,321
TUTORIAL SYSTEM
Edward N. Adams, Mahopac, N.Y., assignor to International Business Machines Corporation, Armonk, N.Y., a corporation of New York
Filed Apr. 15, 1965, Ser. No. 448,469
13 Claims. (Cl. 340—172.5)

ABSTRACT OF THE DISCLOSURE

A teaching machine wherein there is not required the providing therein of pre-synthesized and pre-stored presentations. Instead, control is exercised in part by a student's responses and respective portions of such responses are employed to synthesize further presentations. Thus, machine responses do not exist until they are synthesized in part from student responses after the reception of such responses. This is in contrast to having prepared stored machine responses which are brought from memory by controlled selection. Since it cannot be predicted as to how any one student will respond to a chosen machine presentation, the machine response to a student response is undetermined until it is actually produced as a function of such chosen machine presentation and the student's response thereto. Thus, in the machine whereas the overall discipline governing the production of machine responses is predetermined, the machine responses themselves are not predetermined. Consequently, there is provided a genuinely dynamic tutorial machine.

---

Figure 2A:
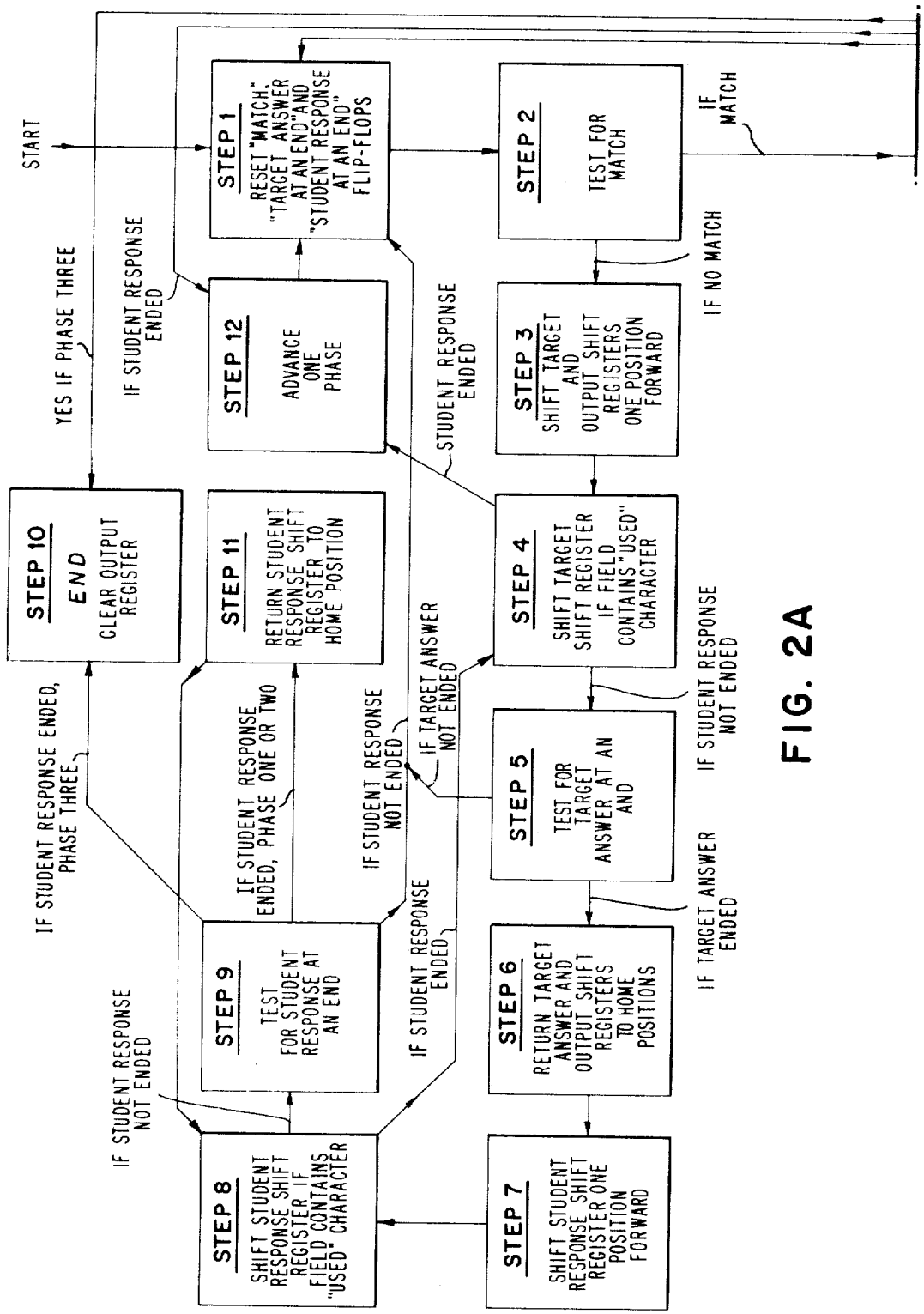

The present invention relates to automated teaching systems and more particularly to an automated teaching system wherein machine responses are constructed or synthesized in part from student responses.

It is now recognized that present achievements in the electronic data processing arts may be advantageously applied to the tutorial arts. The large storage capacities of memory units and the speed of data processing coupled with the machine's ability to simultaneously handle many separate input terminals makes the digital computer a valuable teaching aid. Also, when properly employed, computers can provide excellent individual instruction because the order of presentation may be particularly arranged to elicit critical responses from an individual student which are then used to control further machine presentations.

Among the possible further machine presentations which may follow the evaluation of a given student response would be a related further presentation, or perhaps a cue or hint related to the evaluation.

Systems presently exist wherein the material and the sequence of presentation are relatively fixed. More versatile systems also exist which provide a latitude of choice; that is, depending on a student's response, the future presentations may vary. Thus, the order of presentation and the presented material itself continually branches in directions determined by the form of responses offered by a particular student. In this manner advanced students are handled differently from average students, and average students are handled differently from below average students. Also, the strength and weakness of each student may be determined and be employed as criteria for future presentations.

Heretofore, even with advanced systems, the main body of material presented by the machine has had to be prepared and entered into the machine prior to use. The selection of the presented material may be controlled by the student responses during operation, but the material itself must have been previously created and made available for selection.

A novel teaching machine is herein described which does not require that pre-synthesized and pre-stored presentation be supplied for controlled selection by branching logic. In the present invention, a class of teaching machines is provided which not only is controlled in part by the student's responses, but uses portions of the actual student's responses to synthesize further presentations. Thus, rather than have machine responses prepared and stored and brought from the memory by controlled selection, the responses in the present invention will not exist until synthesized in part from each student response subsequent to the reception of the student response. Since it cannot be predicted how any given student will respond to a presentation, the machine response will be undetermined until actually produced as a function of the given presentation and the student's response thereto. The rules of synthesis, or the overall discipline governing how the machine responses will be constructed are predetermined; but the machine response occurring as a result of the application of the rules cannot be predetermined, because the student's response to a presentation cannot be predicted unless the student offers a fully correct pro forma response.

The significance and usefulness of a teaching machine embodying the principles of the present invention, that is, actually employing the subject matter of the student response in the succeeding presentation under the control of a selected rule is evident. The operation of the machine would be truly tutorial, with the interaction between machine tutor and the student being directly related to and actually formed by the substance of the response of the student. The result is a rapport or harmony between machine and student heretofore unobtainable with any known teaching machine.

An object of the present invention is to provide a teaching machine system for providing machine-constructed messages to a student.

Another object of the present invention is to provide a teaching machine system wherein messages to a student are constructed in part from the preceding student response.

A further object of the present invention is to provide a teaching machine system wherein messages to a student are constructed in part from the preceding student response in accordance with predetermined rules of synthesis.

The foregoing and other objects, features and advantages of the invention will be apparent from the following more particular description of a preferred embodiment of the invention, as illustrated in the accompanying drawings.

In the drawings:

FIG. 1 is a schematic block diagram of an embodiment of a teaching machine system following the principles of the present invention.

FIGS. 2A and 2B combined according to FIG. 2 form a logical flow diagram illustrating the steps and sequences employed in the present invention.

FIGS. 3A through 3H combined according to FIG. 3 illustrate a detailed schematic circuit of the present invention.

Referring to FIG. 1, a schematic block diagram of a teaching machine system is shown including a storage means 10, a presentation means 12, a response means 14, and a comparing and processing means 16.

Storage means 10 in the preferred embodiment is an electronic data storage device for storing digital information such as a core memory, a magnetic tape or a magnetic disc. Information is contained in storage means 10 in the form of binary signals and such information may be selectively entered and removed from memory by input-output devices well known in the art.

Storage means 10 has prestored therein a first plurality of given increments of data arranged in a first given sequence and a second plurality of given increments of data arranged in a second given sequence.

The quality of the increments of data and the manner in which they are arranged in sequence is the subject matter of the topic being taught by the system and will vary in accordance with the topic. For example, if the system were employed to teach chemistry, the given increments of data might be chemical symbols, and the given sequence in which they are arranged might be particular chemical formulae. For purposes of explanation, the subject matter being taught by the present system will be presumed to be the German language. Accordingly, the first plurality of given increments of data arranged in a first given sequence will be alphabet letters arranged to form English words and sentences and the second plurality of given increments of data arranged in a second given sequence will be alphabet letters arranged to form associated German words and sentences.

Thus, the English words and sentences can be considered questions, and the related German words and sentences can be considered the target answers. Storage means 10 also includes control information which regulates the sequence and operation of the system.

Presentation means 12 receives the data read out from storage means 12 and presents it in a manner meaningful to a student. Presentation means 12 may be a visual display board, an audio device or, as contemplated in the present embodiment, an automatic input-output typewriter which operates in response to input data signals from storage means 10 or comparing and processing means 16 and automatically types the data represented by the signals.

Response means 14 is used by the student to construct a response or answer in response to information conveyed by presentation means 12. Response means 14 may be a keyboard device such as the aforesaid input-output typewriter upon which the student may typewrite a response which is then transmitted as electrical output signals to comparing and processing means 16. In the present embodiment, the student's response is the German translation of the English words and sentences conveyed by presentation means 12.

Comparing and processing means 16 receives the target answers from storage means 10, which in the present example is the correct German translation of the English material conveyed by presentation means 12. In comparing and processing means 16 a comparison is made between the increments of data in the target answer from storage means 10 and the increments of data in the student's response from response means 14. When there is a match between the increments of data in the target answer and student response, it indicates that the student is correct, whereas a mismatch between data increments indicates a student error. There are several methods of comparing the target answer and student response and these will be later described in more detail.

The comparing and processing means 16 produces signals which are indicative of the result of the match and mismatches between the target answer and student response, and these comparison signals are then used to process or synthesize a reply to the student.

In the present example a reply sequence is processed containing the increments of data in the student's response which match with the increments of data in the target answer. The output signal (the processed reply sequence of matched data increments) from comparing and processing means 16 is then applied to presentation means 12 so that the student is informed as to which portions of his response was correct and he is thereby encouraged to try again through response means 14 to construct a completely correct response. Thus, the student, in his original response, may have been able to correctly translate some of the English words into German, and may have been able to supply some of the correct letters in those German words incorrectly translated. The comparing and processing means 16 would therefore provide to the presentation means 12 a processed reply sequence which would resemble the target answer except that only the correct letters would be suplied, and the locations in the reply sequence wherein the student was in error would contain blanks, dashes or some other suitable dummy symbol. The student, observing that portions of the response were correct and being reinforced with the correct portions, would then attempt to provide a new response with the correct letters or words in the portions he observed as blanks.

It is also possible to combine the processed reply with other stored information contained in the storage means and to offer the student a combined answer via the presentation means.

As previously stated, the rules governing the compare and synthesis functions in comparing and processing means 16 may vary. One rule which may be employed is that the student's response must agree entirely with the target answer, that is, each letter data increment in the student's response must be correct and in the proper sequence. Another rule may be that if a proper data increment is supplied in the student response, it will match whether or not it is out of sequence.

In the present example, the rule employed is that the increments of data in the student's response are combined in sequences of a given length and compared against the target answer. The length of the sequences may be shortened and further comparisons made. For example, the first seven increments of data (i.e. letters) of the student's response are compared step by step with the entire target answer to determine if an identical sequence is present in the target answer. If no match is indicated, seven more increments of data (i.e. the second through eighth letters) of the student response are compared step by step with the target answer. Thus, the student response is sequenced by single data increments, and strings or sequences of the data increments are compared with the target answer. If a match occurs, the next given length of data increments of the student's response is then compared. For example, if a match had occurred with the first seven letters of the student response, the next comparison is made with the eighth through fourteenth letters of the student response.

After the entire student's response has been compared with the target answer in strings of seven letters and the matched letters stored, a second phase may be employed wherein the student's response and the target answer are again compared, but in strings of five letters, after which a third phase wherein the student's response and the target answer are compared in strings of three letters. The correct comparisons are stored and may be used to synthesize a reply presentation to the student wherein the correct letters are present and the mis-matched letters are replaced by blanks or some other unique symbol. A reply presentation may be made to the student after each phase (i.e. after the seven string compare, after the five string compare, and again after the three string compare) or else a single combined presentation may be made after the third phase. The number of compare phases used and the length of the strings employed on each phase are a matter of design and may be varied to suit each application of the invention.

In the embodiment to be described, a target answer will be compared to a student's response seven letters at a time in a first phase and the comparisons stored. Letters which compare are then replaced by special "used" symbols in the target answer and student response. The target answer and student response are then compared five letters at a time in a second phase and the comparisons are stored. No comparisons are made in locations having special "used" symbols inserted in the previous phase. Letters which compare in the second phase are also replaced by special "used" symbols. Finally the remaining letters in the target answer and student response are compared three at a time in a third phase and the comparisons are stored.

After the third phase is completed a reply is synthesized wherein the letters which matched are presented in proper order to the student and the letters which did not match are replaced in the reply by blank spaces. The student is thus appraised of the portions of the presentation to which he responded correctly and may then try again with a new response.

To illustrate, a typical sequence follows wherein the student is asked to translate into German the sentence "The house has cold rooms." The student's response is compared with the target (the correct translation) in letter groups of seven (phase one), five (phase two), and three (phase three). A reply is synthesized based on the comparisons and presented to the student. The student, if incorrect, attempts further responses. A typical example follows:

Presentation: The house has cold rooms.
Target:

```
Das Haus hat    kalte   Zimmer
1 2 3 4 5 6 7 8 9 10 11 12 13 14 15 16 17 18 19 20 21 22 23 24 25
```

Response (1):

```
Der Haus hase  kalt    Zimmer
1 2 3 4 5 6 7 8 9 10 11 12 13 14 15 16 17 18 19 20 21 22 21 24 25
```

Comparison:

```
( Haus  h    Zimmer           (seven string, phase one)
(4 5 6 7 8 9 10 19 20 21 22 23 24 25
(e    k a l                   (five string, phase two)
(13 14 15 16 17
(                             (three string, phase three)
```

Reply:

```
_____Haus h___kal___Zimmer
```

Response (2):

```
Das Haus has  kaltt    Zimmer
1 2 3 4 5 6 7 8 9 10 11 12 13 14 15 16 17 18 19 20 21 22 23 24 25
    Das Hau  Zimmer        phase one
    1 2 3 4 5 6 7 19 20 21 22 23 24 24
```

Process:

```
(   k a l t          phase two
(13 14 15 16 17
(          s  h      phase three
(          8 9 10
```

Reply:

Das Haus H___kalt__Zimmer

Response (3):

Das Haus hat kalte Zimmer

```
Das Haus hat   kalte   Zimmer
1 2 3 4 5 6 7 8 9 10 11 1   13 14 15 16 17 18 19 20 21 22 23 24 25
``` phase one

Reply:

Das Haus hat kalte Zimmer

The third reply, having no blanks, indicates that the student is correct. Alternatively, the reply "correct" could be presented in the event of a perfect response.

The invention will be described by referring to the system set forth in detail in FIGS. 3A through 3H; however, before describing the system, an explanation of the logical steps employed are set forth.

The logical steps to be described are, in general, carried out by the comparing and processing means 16. The data inputs to the comparing and processing means 16 are obtained from the storage means 10 and the response means 14.

Separate shift registers are included in comparing and processing means 16 to store the target answer from storage means 10 and the student response from response means 14. Another shift register is employed as an output storage register to store those portions of the target answer and student response which compare. The shift registers are referred to as the target register, response register, and output register.

The target, response, and shift registers have more positions than the maximum number 8 letters in any target answer or student response so that the entire target answer may be stored in the target register and the entire student response may be stored in the student register. The target and output registers shift together in synchronism. The target answer is shifted through the target register in given length strings (i.e. seven, five, or three letters) and compared with the student response in a comparator. The comparator will indicate either a match or a not match. If a match occurs, the matched items are entered into the output register. The portion of the target and response registers containing the words to be matched is referred to as the "field" and, depending on the phase, the field will be seven, five, or three bit positions.

Referring to FIG. 2, a flow diagram of the sequence of the system is shown. In FIG. 2, each step is designated by a step number related to the sequence of occurrence of the system to be later described. Prior to step one, the target answer is entered onto the target register with any left-over positions in the register being occupied by special "used" symbols. The same is done for the student response and the response register. Action is initiated by a start pulse which generates Step One.

*Step one*

The match flip-flop is reset to its non-match condition. A "target end" flip-flop and a "response end" flip-flop which respectively indicate if the target answer and student response have come to the end (i.e. whether they have been completely cycled through their registers) are reset to their "not end" condition.

Step Two is initiated.

*Step two*

The fields of the target and response registers are compared. Since the septem is presumed to be in phase one, this means that the first seven letters of the target in the first seven positions of the target shift register are compared with the first seven letters of the student response in the first seven positions of the response shift register. The result will be either a match or a non-match. If a match occurs the sequence skips to Step Thirteen. In the event of a non-match, Step Three is initiated.

*Step three*

No match having occurred in Step Two, the target register and the output register are shifted one position and a new letter is entered in the vacated position of the field of the target register. Step Four is initiated.

*Step four*

If the field of the target register contains special "used" symbols the target register (and the output register) is shifted until the special symbols are shifted out of the field. The special "used" symbols are those which are inserted in place of previously matched letters. If the student response being compared has reached the end (as indicated by an "end" character) the sequence skips to Step Twelve, otherwise Step Five is initiated.

*Step five*

If the field of the target register contains an "end" symbol indicating the end of the target answer, Step Six is initiated. If the field of the target register does not contain an "end" character, Step One is initiated and the sequence repeats.

From the sequence thus far, it can be seen that the response register contains a string of letters and the target response is streamed through the target register letter by letter and compared with the contents of the response register until the entire target answer ends, as indicated by an "end" character. The letter by letter sequence of the target register is altered only when special "used" symbols indicating previously compared letters are present in the target register. When the entire target answer has been streamed through the target register and an "end" character in the field is detected, Step Six is initiated.

*Step six*

The target answer is caused to shift backwards through the target register from the "end" symbol until another special "end" symbol is reached in the field. Step Seven is then initiated.

*Step seven*

The contents of the response register is shifted forward one bit position and a new letter is entered in the vacant field position. Step Eight is initiated.

*Step eight*

The response register is shifted if the field contains a special "used" symbol. The response register shifts until no "used" symbols are present in the field. Step Nine is initiated.

*Step nine*

The field of the response register is tested to determine whether it contains an "end" symbol indicating the end of the student response. If an "end" symbol is present and the system is in Step Three, Step Ten is then initiated. If an "end" symbol is present in the field and the system is not in Step Three, Step Eleven is then initiated. If the response register field does not contain an "end" symbol (the student response not being at an end), Step One is generated and the sequence is repeated, that is, the target answer is streamed through the field of the target register and compared with the contents of the field of the response register, the response register having been shifted.

It is seen from the foregoing that the letters of the target response are compared in groups with an equal group of letters of the student's response. The target answer is streamed past a given group of letters of the student response and then the group of letters of the student response is shifted at least one letter and the target answer is again streamed past. When the end of the student response is finally shifted into the field of the target register, it means that all possible comparisons of the groups of letters in the target answer and the student response have been tested for a match. If the end of the student response is reached at the end of the third phase (i.e. groups of three letters, the entire sequence is ended and Step Ten is generated which causes the output register to be read out and transmitted as a reply.

If the student response is at an end and the system is in either the first or second phase, Step Eleven is initiated.

*Step eleven*

The student response is caused to shift backwards through the response register until a special used symbol appears in the field. Step Eight is initiated. At this time the student response has ended and an "end" flip-flop has been set to its "end" state. Thus, the initiation of Step Eight now causes the initiation of Step Four rather than Step Nine. The student response having ended, the initiation of Step Four now causes the initiation of Step Twelve rather than Step Five.

*Step twelve*

The phase of the system is advanced. If the system had been in phase one, it advances to phase two wherein the number of letters compared on the register fields is five. If the system had been in phase two, it advances to phase three wherein the number of letters compared in the register fields is three. Step One is then initiated and the sequence of the system is repeated.

The sequence just described did not consider the occurrence of a match. If a match occurs at Step Two between the contents of the fields of the target and response registers, a "match" flip-flop is set to a "match" condition and Step Thirteen is initiated instead of Step Three.

*Step thirteen*

Special used symbols are substituted for the letters in the fields of the response and the target registers (i.e. the matched letters.

If the system is in phase one, Step Fourteen is initiated; if the system is in phase two, Step Fifteen is initiated; and if the system is in phase three, Step Sixteen is initiated.

*Step fourteen*

The response, target and output registers are shifted seven positions forward. Step Seventeen is initiated.

*Step fifteen*

The response, target, and output registers are shifted five positions forward. Step Seventeen is initiated.

*Step sixteen*

The response, target, and output registers are shifted three positions forward. Step Seventeen is initiated.

*Step seventeen*

If the target register field contains one or more special "used" symbols, the target and output register are shifted until they are gone from the target register field. If the target answer is at the end (i.e. an "end" character is present in the field), Step One is initiated and the sequence continues therefrom. If the target answer has not ended, Step Eighteen is initiated.

*Step eighteen*

If the response register field contains one or more special "used" symbols, the response register is shifted until they are gone from the field. If the student response has come to an end, Step Twelve is initiated and the sequence continues therefrom. If the student response is not at the end, Step Nineteen is initiated.

*Step nineteen*

The response register is tested to determine if its field contains an "end" character. If it does not, Step Twenty is initiated. If it does, Step Twenty-one is initiated.

*Step twenty*

The target register is tested to determine if its field contains an "end" character indicating the target answer has come to an end. If an "end" symbol is not present, Step One is initiated and the sequence continues therefrom. If an "end" symbol is present, Step Twenty-one is initiated.

*Step twenty-one*

The target answer is shifted backward through the target register until a "used" special symbol is in the field. If the student response has not come to an end, Step Seventeen is initiated and the sequence continues therefrom. If the student response has come to an end, Step Twenty-two is initiated.

*Step twenty-two*

The phase of the system is determined. If the system is in phase three, Step Ten is initiated and sequence ends. If the system is not in phase three, Step Twenty-three is initiated.

*Step twenty-three*

The student response is shifted backward through the response register until a special "end" symbol is in the field. Step Eighteen is initiated and the sequence continues therefrom.

A system to carry out the steps set forth in the preceding discussion is shown in FIGS. 3A through 3H.

Figure 3C:
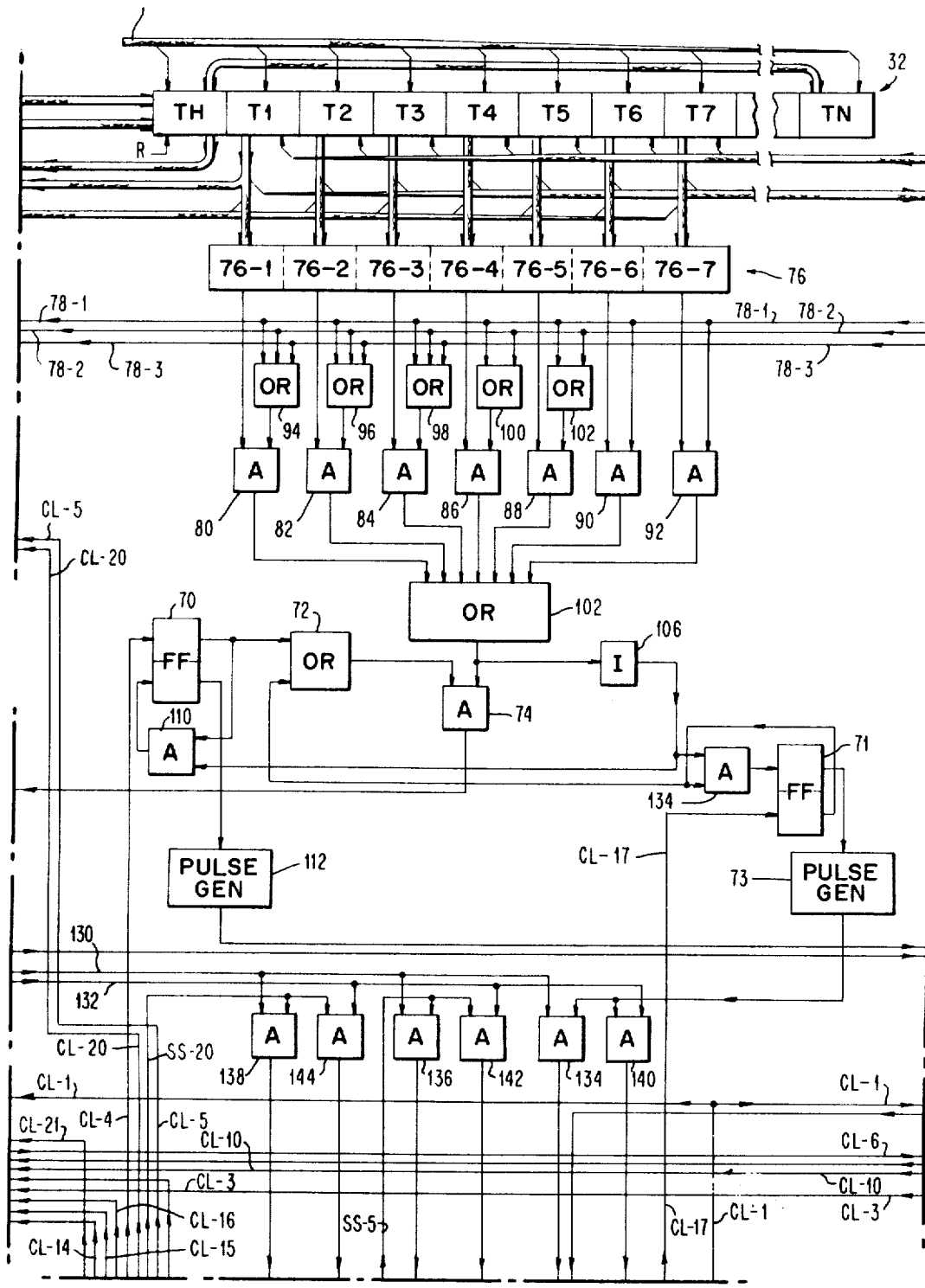
Figure 3E:
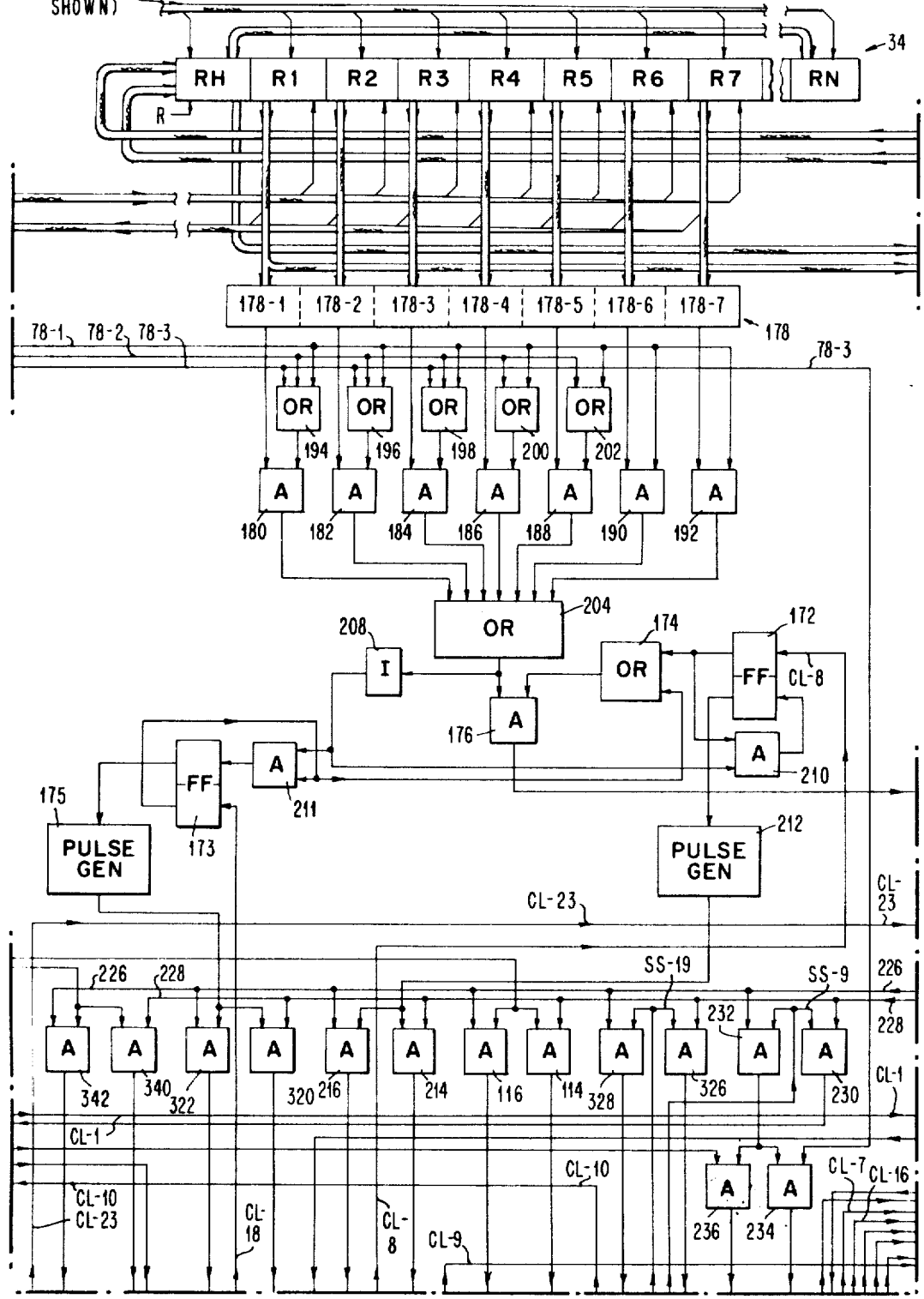

The system includes a target shift register 32 (FIG. 3C) and a response shift register 34 (FIG. 3E). Both the target shift register 32 and the response shift register 34 have N positions where N is a number greater than the number of letters anticipated in any given target answer and student response. Thus, the entire target answer from storage means 10 may be entered into the target shift register and the entire student response from response means 14 may be entered into the response shift register. In the initial state, that is, before either the target answer or the student response are entered into the respective shift registers, these registers have in each position a distinct symbol referred to as an "end' character. Thus, all positions of the target register and the response register initially contain these "end" characters. The target answer is entered into the target shift register 32 from shift register positions T*l* through T*j* (where T*j* is the last letter of the target answer) in a letter by letter fashion; that is, each letter of the target answer occupies a different storage position in the shift register. It is understood that the letters are represented in some form of conventional binary code.

Likewise, the student response is entered into the response register 34 in the same manner occupying the positions R*l* up to R*j*. The letters of the target answer and student response replace the "end" characters previously occupying those positions. The remaining positions in the target register 32 and the response register 34 continue to contain "end" characters.

Figure 3G:
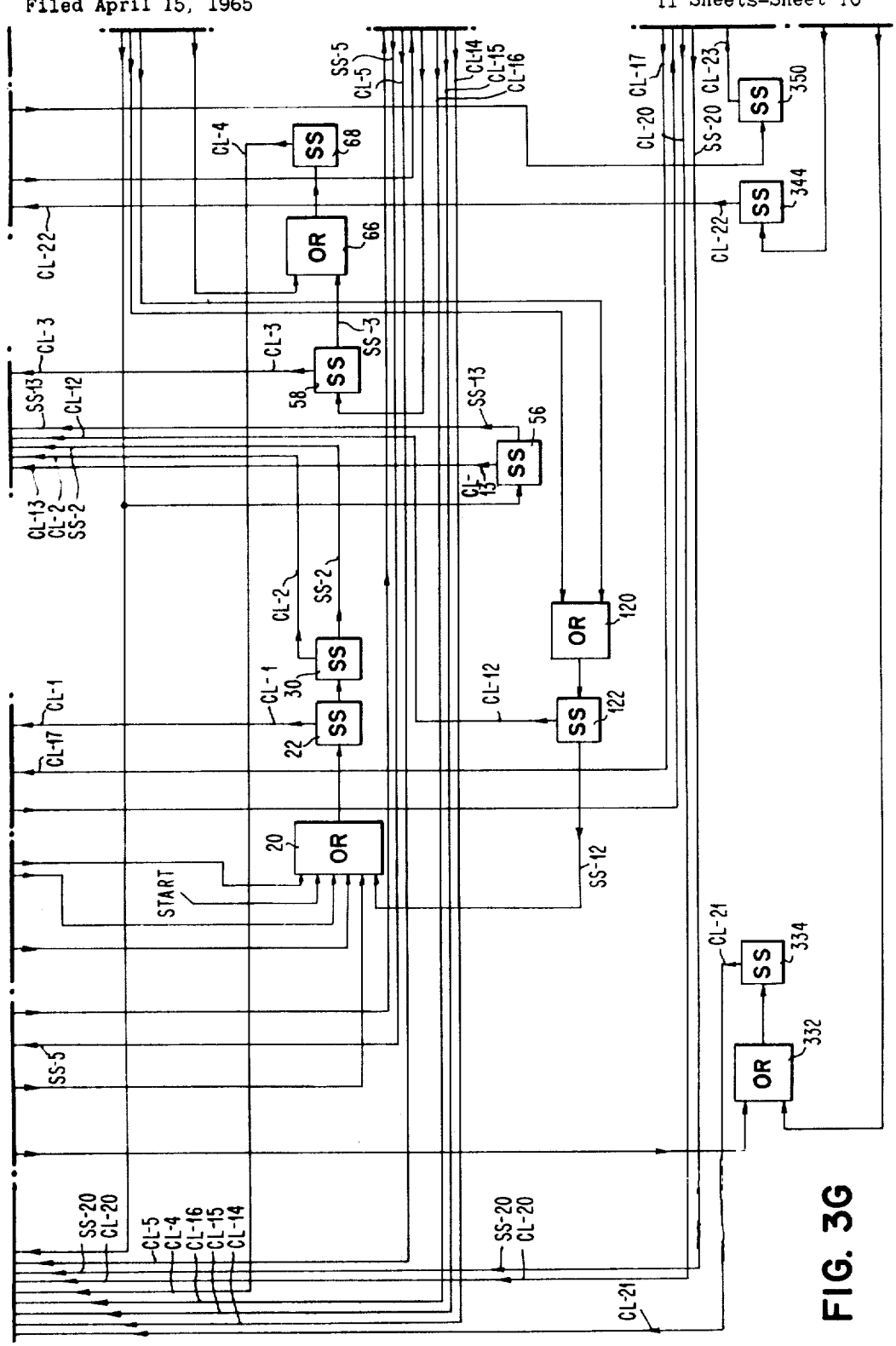

When the target answer and the student response are entered in their respective shift registers by conventional input control means, a start pulse is generated (for example by a "start" key on response means 14) which is applied through "OR" circuit 20 (FIG. 3G) as a trigger pulse applied to single shot circuit 22 (FIG. 3G). Single shot circuit 22 stays triggered on for a given length of time and during that given length of time produces output pulse CL–1. Pulse CL–1 is one of a group of timing sequence clock pulses which determine the system sequence. The clock pulses are related to the steps previously described. Thus, pulse CL–1 initiates Step One, pulse CL–2 initiates Step Two, pulse CL–3 initiates Step Three, etc. Output pulse CL–1 is applied to the "student response at an end" flip-flop 24 (FIG. 3F), setting it to its "response not at an end" state. Pulse CL–1 is also applied to a "target response at an end" flip-flop 26 (FIG. 3B), setting it to its "target not at an end" state. Pulse CL–1 is also applied to "match" flip-flop 28, setting it to its "not match" state. The flip-flop 26 now provides a signal on lead 132 which indicates that the target answer has not ended. The flip-flop 24 now provides a signal on lead 228 indicating that the student response is not ended and the "match" flip-flop 28 now provides a signal on lead 29 indicating that no match has yet occurred. After a given time, single shot circuit 22 turns off and pulse CL–1 ends. In turning off, a momentary pulse SS–1 is generated by flip-flop circuit 22 which is applied to single shot circuit 30 (FIG. 3G) which then is triggered on for a given time. While single shot circuit 30 is on, a pulse CL–2 is generated. Before discussing the effect of pulse CL–2, it might be mentioned that the target shift register 32 and the response shift register 34 are coupled to a compare unit 36 (FIG. 3D). That is, the first seven positions of the target shift register (labeled T1 through T7) and the first seven positions of the response register (labeled R1 through R7) are coupled to the compare unit 36, the contents of positions T1 and R1 being compared at comparator position C1, the contents of T2 and R2 being compared at comparator position C2, the contents of T3 and R3 being compared at comparator position C3 and so on to the contents of T7 and R7 being compared at comparator position C7. The outputs of the seven compare positions C1 through C7 are applied to separate "AND" circuits (FIG. 3G). The first "AND" circuit 38, which is coupled to the output of compare position C1, is also coupled to single shot circuit 30 and receives pulse CL–2 as its other input. The output of the first "AND" circuit 38 is connected as an input to the second "AND" circuit 40 which is also connected to the output of compare position C2. The output of the second "AND" circuit 40 is connected to the input of the third "AND" circuit 42 which is also connected to the output of position C3. The output of the third "AND" circuit 42 is connected as an input to the fourth "AND" circuit 44 which is also connected to the output of compare position C4. The output of the fourth "AND" circuit 44 is connected as an input through the fifth "AND" circuit 46 which is also connected to the output of compare position C5. The output of the fifth "AND" circuit 46 is connected as an input through the sixth "AND" circuit 48 which is also connected to the output of compare position C7 and the output of the sixth "AND" circuit 48 is also connected as an input to the seventh "AND" circuit 50 which is also connected to the output of compare position C7.

Thus, if the letter contained in the first position T1 of the target shift register 32 is the same as that contained in the first position R1 of the response register 34, an output will be generated from compare position C1 and gated at "AND" circuit 38 with pulse CL–2 from single shot circuit 30, thereby applying an input to the second "AND" circuit 40. If the letter in the second position T2 of the target register 32 is the same as the letter in the second position R2 of the response register 34, an output signal will be generated from compare position C2 and the second "AND" circuit 40 will be gated thereby applying an input signal to the third "AND" circuit 42. If the contents of the third storage positions T3 and R3, respectively, of the target register 32 and the response register 34 are the same, an output signal will be produced from compare position C3 and the third "AND" circuit 42 will be gated, thereby applying an input signal to the fourth "AND" circuit 44, and so on. It can be seen that if the contents of the first seven storage positions of the target register 32 are the same as that of the response register 34; that is, if the first seven letters of the student response are the same as the first seven letters of the target answer, an output signal will be produced from the seventh "AND" circuit 50 at the time of pulse CL–2. If one or more of the first seven letters of the target answer and the student response are not the same, no output will be generated from the associated compare position and no output signal will be produced from the seventh "AND" circuit 50. The seventh "AND" circuit 50 is connected as an input to "OR" circuit 51 which is connected through the "match" flip-flop 28. Thus, if the first seven letters of the target answer and the first seven letters of the student response are the same, the "match" flip-flop 28 will be triggered and an output signal is applied to an "AND" circuit 53. If the first seven letters of the target answer do not exactly match the first seven letters of the student response, "match" flip-flop 28 will remain in its non-match state and a signal will be applied therefrom to an "AND" circuit 54. After a given time, single shot circuit 30 (FIG. 3G) turns off and in turning off, an SS–2 pulse is momentarily generated which is applied to "AND" circuits 53 and 54 (FIG. 3D). If a match had occurred, "AND" circuit 53 would have been gated, but if a match had not occurred, "AND" circuit 54 would have been gated. The output of "AND" circuit 53 is applied as an input trigger signal to single shot circuit 56 (FIG. 3G) and the output of "AND" circuit 54 is applied as an input trigger signal to single shot circuit 58 (FIG. 3G).

It is to be noted that if the system is in phase one, all seven "AND" circuits 38 through 50 (FIG. 3D) are employed. If the system is in phase two, a signal will be present on lead 78–2 from a phase counter 78 to be later described. In such case, the output of "AND" circuit 46 is applied along with lead 78–2 to an "AND" circuit 47 (FIG. 3D). Thus, if the first five letters of the target answer and the student response are the same, "AND" circuit 47 will be gated and a compare signal transmitted through "OR" circuit 52 to indicate a "match."

Likewise, a phase three lead 78–3 from phase counter 78 will have a signal thereon if the system is in phase three and will be connected to "AND" circuit 43 along with the output of "AND" circuit 42. Thus, if the first three letters of the target answer and student response are the same, a compare signal will be transmitted through "OR" circuit 51 to indicate a "match." In such manner, depending on the phase of the system, a match between three, five, or seven letters of the target answer and student response can be made.

It will be assumed that no match has occurred so that "AND" circuit 54 is gated and an input signal is applied as a trigger pulse to single shot circuit 58 (FIG. 3G). When single shot circuit 58 turns on, an output pulse CL-3 is generated for a given time. Pulse CL-3 is applied as an input signal to a shift pulse generator circuit 60 (FIG. 3B) which produces a single shift pulse. The output of shift pulse generator 60 is transmitted through "OR" circuit 62 and applied to target register 32 to shift its contents one position forward and is also applied to the output register 64 (FIG. 3A) to shift the output register 64 one position forward. When single shot circuit 58 turns off, an output signal is momentarily generated therefrom which is transmitted through an "OR" circuit 66 and applied as an input trigger pulse to single shot circuit 68 (FIG. 3G). When single shot circuit 68 is triggered on, a CL-4 pulse is generated. The CL-4 pulse is employed to trigger a flip-flop 70 (FIG. 3C) to its "on" state. The "on" output of the flip-flop 70 is transmitted through "OR" circuit 72 to "AND" circuit 74. The other input to "AND" circuit 74 is a signal which indicates if the field of the target register 32 contains a special "used" character. The seven bit positions T1 through T7 of the target register 32 are also applied to a "used" character decoder 76. Used character decoder 76 will recognize if any of the positions T1 through T7 of the target register 32 contain a special "used" character and if so will produce an output signal. More particularly, the "used" character decoder 76 consists of seven separate decoder circuits 76-1 through 76-7 such that an output from the first decoder circuit 76-1 will be generated if position T1 contains a "used" character. An output from the second decoder circuit 76-2 will produce an output if the bit position T2 contains a "used" character and so on to the last or seventh decoder circuit 76-7 which will produce an output signal if position T7 contains a "used" character. The "used" character is a special binary word and the "used" character decoder circuits are merely logical combinations of inverter and "AND" circuits which produce an output in response to a "used" character input signal.

It may also be mentioned that the system includes a phase counter 78 (FIG. 3D) which is a three position counter, the three positions being labeled phase one, phase two, and phase three respectively. Before starting the system, the phase counter 78 is reset to phase one so that an output signal is present on the output lead 78-1 from phase one of the counter and no signal is present on the output leads 78-2 and 78-3 from phase two and phase three respectively of the counter. The output signal from phase one of the counter 78 is applied via lead 78-1 directly to "AND" circuits 90 and 92 (FIG. 3C) and through "OR" circuits 94, 96, 98, 100, and 102 to "AND" circuits 80, 82, 84, 86, and 88, respectively. "AND" gate circuit 80 is also connected to the first decoder circuit 76-1 of the "used" character decoder 76 and "AND" circuit 82 is also connected to the output of the second decoder circuit 76-2 of the "used" character decoder 76. "AND" circuit 84 is also connected to the third character decoder circuit 76-3 of the "used" character decoder 76. "AND" circuit 86 is also connected to the fourth decoder circuit 76-4 of the "used" character decoder 76. "AND" circuit 88 is also connected to the fifth decoder circuit 76-5 of the "used" character decoder 76. "AND" circuit 90 is also connected to the output of the sixth decoder 76-6 of the "used" character decoder 76. "AND" circuit 92 is also connected to the seventh decoder circuit 76-7 of the "used" character decoder 76. Thus, if any of the positions T1 through T7 of the target register contain a special "used" character, an output signal will be generated from the appropriate one of the decoder circuits 76-1 through 76-7 in the "used" character decoder 76 and will be gated through the associated "AND" circuit and a signal will thus be transmitted through "OR" circuit 102. The output of "OR" circuit 102 is connected as the other input to "AND" circuit 74. Thus, the flip-flop 70 having been conditioned by pulse CL-4 and providing a signal through "OR" circuit 72 to "AND" circuit 74, "AND" circuit 74 will be gated if any of the positions T1 through T7 of the target register contain a special "used" character. The output of "AND" circuit 74 is applied to a shift pulse generator 104 (FIG. 3B) which will generate a sequence of shift pulses as long as there is an input applied thereto from "AND" circuit 74. Thus, the target register 32 will be shifted until all the special "used" characters are shifted out of the positions T1 through T7. The output of "OR" circuit 102 is also applied through an inverter circuit 106 to an "AND" circuit 110 along with the lead from flip-flop 70 such that if the "used" characters are shifted out of the seven positions of the target register 32 or if there were no "used" characters in the target register positions T1 through T7 to begin with, then there will be no output signal from "OR" circuit 102 and an output signal will be generated from "AND" circuit 110 which is used to reset the flip-flop 70. Then the flip-flop 70 is reset, a pulse from a pulse generator 112 is momentarily produced which is applied to "AND" circuits 114 and 116 (FIG. 3E). The other input to "AND" circuit 114 is from the "response is not at an end" side of flip-flop 24 (FIG. 3E) which will be up if the student response has not ended. The "AND" circuit 116 other input is from the "response is ended" side of flip-flop 24 which will be up if the student response has come to an end. If the student response has not come to an end, "AND" circuit 114 will be gated and the output pulse therefrom will be applied as a trigger signal to single shot circuit 118 (FIG. 3H) which produces a pulse CL-5. If the student response has come to an end, "AND" circuit 116 will be gated and the output pulse therefrom will be applied through "OR" circuit 120 as a trigger signal to a single shot circuit 122 (FIG. 3G). Single shot circuit 122, when triggered, generates a pulse CL-12. Pulse CL-2 is connected as an input to the phase counter 78 (FIG. 3D) and advances the phase counter one phase.

Thus, if the phase counter 78 were set to phase one as previously described, it will now shift to phase two which means the output from the phase two lead will have a signal thereon and the output lead from phase one and phase three portions will not. After a given time, single shot circuit 122 turns off, the CL-12 pulse ends, and a momentary pulse SS-12 is generated which is applied through "OR" circuit 20 to trigger single shot circuit 22 which again generates pulse CL-1. This means that the contents of the target register 32 has been compared with the entire student response and that the target register 32 should be shifted and a new target field compared with the student response.

Assume, however, that the target response did not come to an end and that an output signal has been gated through "AND" circuit 114 causing the single shot circuit 118 to be triggered and to produce pulse CL-5. Pulse CL-5 is transmitted through an "OR" circuit 124 to an "AND" circuit 126 (FIG. 3B). The other input to the "AND" circuit 126 is from a special "end" character decoder 128 which is coupled to the output of position T1 of the target register 32. If position T1 of the target register 32 contains a special "end" character, it will be decoded by the special "end" character decoder 128 which will generate and apply a signal to the "AND" circuit 126. The only time that a special "end" character can appear in position T1 of the target register 32 is when the target answer has come to an end; thus, an output from the "AND" circuit 126 is applied to the "target at an end" flip-flop 26 causing it to go to its "target answer at an end" state which means that the left lead 130 is "up" and the right lead 132 is "down." The output lead 130 of flip-flop 26 is coupled to the inputs to "AND" circuits 134, 136, and 138 (FIG. 3C). If position T1 of the target register 32 did not contain an "end" character, there will be no output from the special character decoder 128 and the "AND" circuit 126 will not be enabled; thus, the flip-flop will stay in its "target answer is not at an end" state wherein the lead 132 is in the "up" condition thereby applying an input signal to "AND" circuits 140, 142, and 144 (FIG. 3C). After a given time, single shot 118 turns off and pulse CL–5 ends and a momentary pulse SS–5 is generated which is applied to "AND" circuits 142 and 136. If the target answer has not ended, "AND" circuit 142 will be gated and an output pulse generated therefrom will be connected through "OR" circuit 20 as an input trigger pulse to single shot circuit 22, thereby generating pulse CL–1 previously described. If the target answer has come to an end, "AND" circuit 136 will be gated and an output pulse therefrom will be applied as an input trigger signal to a single shot circuit 146. Single shot circuit 146, when triggered, produces a pulse CL–6 which is applied to a flip-flop circuit 158 to trigger it to its "on" state. The "on" output of flip-flop 158 is transmitted through an "OR" circuit 148 to an "AND" circuit 150 (FIG. 3B). The other input to the "AND" circuit 150 is dependent on the output of the TH position of the target register which is one position in advance of T1. The output from the TH position is applied to special "end" character decoder 152 and then through an inverter circuit 154 to the "AND" circuit 150.

It was stated previously that prior to introducing the target answer into the target register 32 all positions of the target register contained special "end" characters. The target answer was then entered letter by letter into the target register from position T1 to some position Tj. Thus, when the first letter of the target answer is located in position T1, there will be a special "end" character in position TH. When the first letter of the target answer occupies the first position T1, the condition is known as the home position. If the target answer is not in the home position, there will be some letter other than an "end" character in the TH position and there will be no output from special "end" character decoder 152, and therefore, there will be an output from the inverter 154. Consequently, the "AND" circuit 150 will be gated thereby producing and applying a signal to the shift pulse generator 156 which causes the target register 32 to be shifted backwards or, as depicted in the figure, to the right. The shift pulse generator 156 will continue to shift the target register as long as it receives an input from the "AND" circuit 150. When the first letter of the target answer finally reaches the T1 position, an "end" character will appear in the TH position and an output will be produced from the special "end" character decoder 152 which, when inverted by the inverter 154, will disable the "AND" circuit 150 and the shifting pulses from shift pulse generator will cease. The output from the special "end" character decider 152 is also applied to the flip-flop 158 as a reset pulse. When flip-flop 158 is reset it applies a signal to a pulse generator 160 which, when so triggered, produces a momentary pulse output which is applied as a trigger signal to single shot circuit 162 (FIG. 3H) which turns "on" and produces a pulse CL–7. Pulse CL–7 is applied to a shift pulse generator 164 (FIG. 3F) which produces a single shift pulse which is transmitted through the "OR" circuit 166 to the response shift register 34 causing it to shift one position forward (i.e. to the left). When single shot circuit 162 turns off after a given time, it momentarily generates pulse SS–7 which is transmitted through the "OR" circuit 168 as an input trigger to a single shot circuit 170 which when triggered on produces a pulse CL–8.

Pulse CL–8 is applied to and switches a flip-flop circuit 172 (FIG. 3E), the output of which is then transmitted through "OR" circuit 174 to an "AND" circuit 176. The output of the positions R1 through R7 of the response register 34 are applied as inputs to seven separate "used" character circuits 178–1 through 178–7 within a "used" character decoder 178 (FIG. 3E). The "used" character decoder 178 connected to the response register 34 is identical to used character decoder 76 associated with the target register 32. Thus, the "used" character decoder circuits 178–1 through 178–7 will produce an output signal if the associated one of the positions R1 through R7 of the response register 34 contains a special "used" character.

The outputs of used character decoder circuits 178–1 through 178–7 are connected to the inputs of "AND" circuits 180, 182, 184, 186, 188, 190, and 192, respectively. The phase one lead of phase counter 78 is connected directly to "AND" circuits 190 and 192, and is connected to "AND" circuits 180, 182, 184, 186, and 188, through "OR" circuits 194, 196, 198, 200, and 202, respectively. When the system is in phase one, as is the case, a gating signal is therefore applied to all the "AND" circuits 180 through 192. If any of the positions R1 through R7 of the response register 34 contain a "used" character, a signal will be produced by the associated ones of used character decoder circuits 178–1 through 178–7 and the associated ones of "AND" gates 180 through 192 will be gated and a signal applied through "OR" circuit 204 to "AND" circuit 176.

The output of "AND" circuit 176 is connected to the input of a shift pulse generator circuit 206, which will produce a series of shift pulses as long as an input signal is being applied from "AND" circuit 176. The output from shift register 206 is connected through "OR" circuit 166 to response shift register 34. Thus, as long as any of the positions R1 through R7 of response register 34 contain an "end" character, an output signal will be produced from "AND" circuit 176 and response register 34 will be shifted. When positions R1 through R7 do not contain any "end" characters, there will be no output signals from any of the used character decoder circuits 178–1 through 178–7 and consequently "AND" circuit 176 will be disabled, and the shift pulse generator 206 will turn off and response register 34 will cease shifting.

Figure 3H:
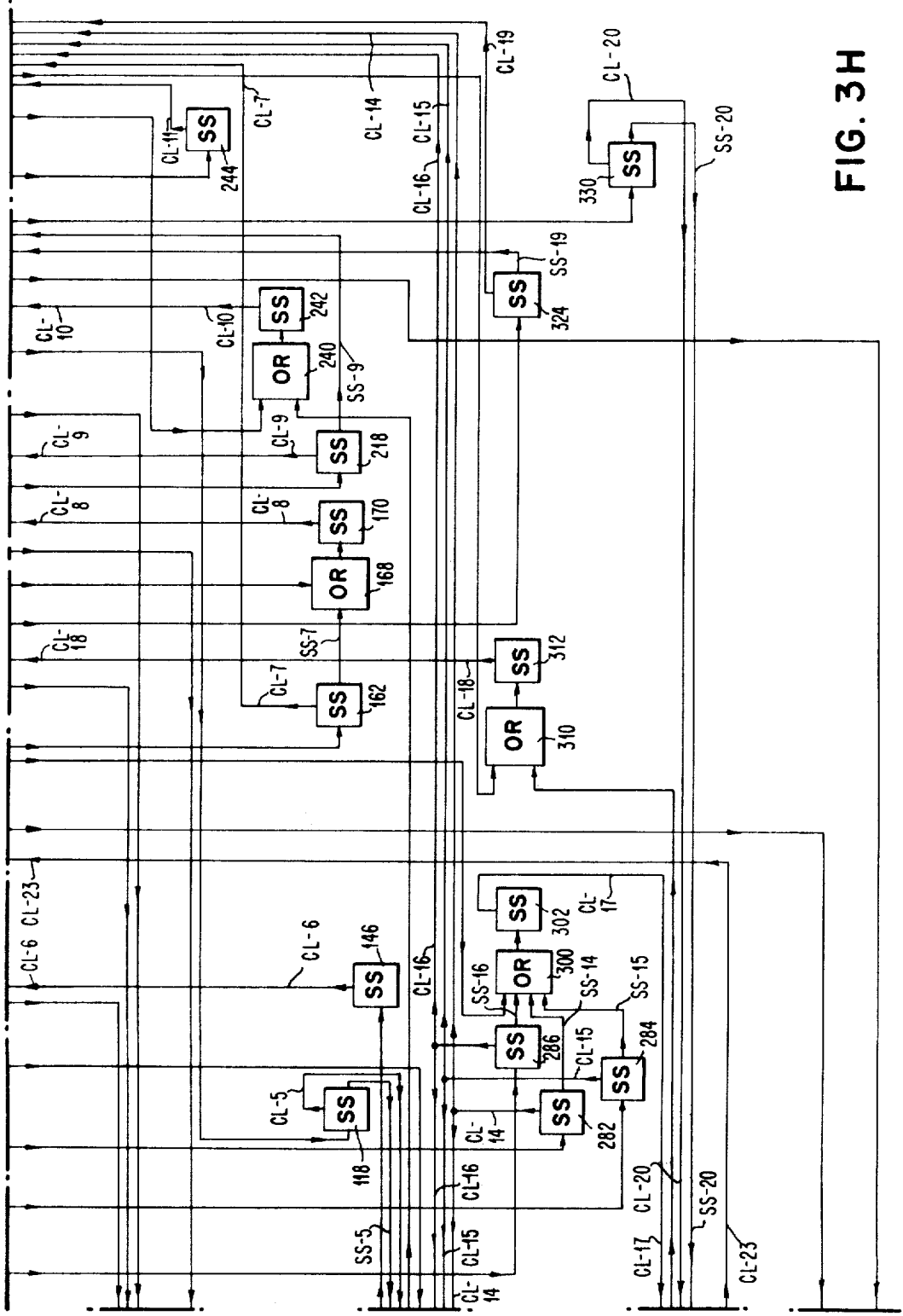

The output of "OR" circuit 204 is also applied through an inverter circuit 208 to an "AND" circuit 210, such that if the "used" characters in positions R1 through R7 are shifted out of the response register 34 or if there were no "used" characters in the target register positions R1 through R7 to begin with, then there will be no output signal from "OR" circuit 204 and an output signal will be generated from "AND" circuit 210 which is used to reset the flip-flop 172. When the flip-flop 172 is reset it applies a trigger signal to pulse generator 212 and pulse generator 212 thereby produces a momentary pulse which is connected to "AND" circuits 214 and 216. The other input to "AND" circuit 214 is from the "response is not at an end" side of flip-flop 24 on lead 228 and the other input to "AND" circuit 216 is from the "response is at an end" side of flip-flop 24 on lead 226. If the student response has not come to an end, "AND" circuit 214 will be gated and if the student response has come to an end "AND" circuit 216 will be gated. The output from "AND" circuit 214 is connected as an input trigger signal to a single shot circuit 218 (FIG. 3H). The output from "AND" circuit 216 is coupled through "OR" circuit 66 to single shot circuit 68, thereby again generating pulse CL–4, the effect of which has been previously described.

Assuming that the student response has not come to an end and that "AND" circuit 214 is gated, single shot circuit 218 is triggered thereby, and a pulse CL-9 is produced. Pulse CL-9 is applied through "OR" circuit 220 to "AND" circuit 222 (FIG. 3F). The other input to "AND" circuit 222 is from the output of a special "end" character decoder 224, which is identical to special "end" character decoders 128 and 152. Special "end" character decoder 224 is connected to the first position R1 of the response register 34. If position R1 of the response register 34 contains a special "end" character, it will be decoded by the special "end" character decoder 224 which will generate and apply a signal to the "AND" circuit 222. The only time that a special "end" character can appear in position R1 of the response register 34 is when the student response has come to an end. Thus, an output from the "AND" circuit 222 is applied to the "response at an end" flip-flop 24 causing it to go to its "response at an end" state, which means that the right lead 226 has a signal thereon and left lead 228 does not.

If position R1 of response register 34 does not contain a special "end" character there will be no output from special "end" character decoder 224, and "AND" circuit 222 will not be gated, and flip-flop 24 will stay in its "response not at an end" state which means that lead 228 will have a signal thereon and lead 226 will not. Thus, depending upon whether the student response has come to an end, either lead 226 or lead 228 will have a signal thereon. Lead 228 is connected as an input to an "AND" circuit 230 and lead 226 is connected as an input to "AND" circuit 232. After a given time single shot circuit 218 turns off and pulse CL-9 ends. In turning off, single shot circuit 218 generates a momentary pulse SS-9 which is applied as an input signal to "AND" circuits 230 and 232.

If the student response has not ended, a signal will be present on lead 228 and "AND" circuit 230 will be gated. The output signal from "AND" circuit 230 is applied as an input signal to single-shot circuit 22 via "OR" circuit 20, thereby producing pulse CL-1, the effect of which has been described.

If the student response had ended, "AND" circuit 232 will be gated and the signal therefrom is applied as an input signal to "AND" circuits 234 and 236. The other input to "AND" circuit 234 is the phase three output lead 78-3 from phase counter 78. The phase three output lead 78-3 from phase counter 78 is also inverted by an inverter circuit 238 which will provide an output signal when the system is not in phase three. The output lead from inverter circuit 238 is applied to the input of the "AND" circuit 236. Thus, if the student response has come to an end, an output signal from "AND" circuit 232 is applied to "AND" circuits 234 and 236. If the system is in phase three, "AND" circuit 234 will be gated; if the system is not in phase three, "AND" circuit 236 will be gated.

The output signal from "AND" circuit 234, which indicates that the student response has come to an end and that the system is in phase three, is applied as an input signal through "OR" circuit 240 to a single shot circuit 242, thereby triggering single shot circuit 242 which produces an output pulse CL-10. Pulse CL-10 indicates that the entire student response has been compared with the target answer in all three phases and that the contents of the output register may now be transmitted to the presentation means 12. Thus pulse CL-10 is used as a readout pulse applied to gates 65-1 through 65-N (FIG. 3A) to read out output register 64, and transfer the contents thereof to presentation means 12 (not shown).

If the student response has come to an end, but the system is not in phase three, "AND" circuit 236 will be gated and output signal therefrom will be applied to and will trigger a single shot circuit 244, thereby producing an output pulse CL-11. Pulse CL-11 is employed to trigger a flip-flop 245 to its "on" state. The output of flip-flop 245 is transmitted through an "OR" circuit 246 to an "AND" circuit 248. A special "end" character decoder 250 is connected to the position RH of the response register 34. Special "end" character decoder 250 is identical to special "end" character decoders 224, 128, and 152; that is, it will produce an output signal if an "end" character is present in position RH of response register 34. The output of special "end" character decoder 250 is applied through an inverter circuit 252 to the "AND" circuit 248. Thus, if there is a special "end" character in position RH, an output signal will be produced by special "end" character decoder 250, which is inverted by inverter circuit 252 and disables "AND" circuit 248. If position RH does not contain an end character there will be no output signal from special character decoder 250; but the inverter 252 will thereby apply a gating signal to "AND" circuit 248, which will be gated after the occurrence of pulse CL-11. The output of "AND" circuit 248 is connected as an input to a shift pulse generator 254.

Shift pulse generator 254 will produce a series of shift pulses which will shift response register 34 backward as long as a signal is being produced by "AND" circuit 248. Response register 34 being shifted backward will eventually have an end character entered into position RH. When this occurs, there will be an output signal produced from special "end" character decoder 250 which when inverted by inverter circuit 252 will disable "AND" circuit 248, thereby causing shift register 254 to stop. The output of special "end" character decoder 250 is also connected back to flip-flop 245 as a reset pulse. Flip-flop 245, when reset (when an end character is present in position RH), triggers a pulse generator 247, which produces a momentary output pulse. The pulse from pulse generator 247 is conducted through "OR" circuit 168 as an input trigger signal to single shot circuit 170 to generate pulse CL-8, the operation of which has been previously described.

In the discussion thus far, it was explained how the pulses designated as CL-1 through CL-12 are generated and how they affect the operation of the system. Pulses CL-1 through CL-12 are equivalent to Steps One through Twelve, described in the preceding discussion, and are operative if there is no match occurring between the contents of the student response register 34 and the target answer register 32 during Step Two (that is, after the generation of pulse CL-2).

If a match had occurred, that is if a signal is transmitted through "OR" circuit 51 (FIG. 3D), the "match" flip-flop 28 will be triggered and "AND" circuit 52 will be gated when pulse CL-2 is generated. The output of "AND" circuit 53 which indicates that a match has occurred, is applied as an input trigger signal to single shot circuit 56 which then generates a pulse CL-13.

At the same time, the output of "AND" circuit 52 is also applied to the inputs of "AND" circuits 53, 55, and 57. The phase one lead from phase generator 78 is connected to "AND" circuit 53, the phase two lead is connected to "AND" circuit 55, and the phase three lead is connected to "AND" circuit 57. A group of seven gate circuits 59-1 through 59-7 are respectively connected between positions T1 through T7 of target register 32 and positions 64-1 through 64-7 of output register 64 such that gate 59-1 will transfer the contents of register position T1 into register position 64-1. Gate 59-2 gates the contents of register position T2 into register position 64-2, and so on to gate 59-7 which gates the contents of register position T7 into register position 64-7.

"AND" circuit 53 is directly connected to gates 59-6 and 59-7, through "OR" circuit 61 to gates 59-4 and 59-5, and through "OR" circuit 63 to gates 59-1, 59-2, and 59-3.

"AND" circuit 55 is connected through "OR" circuit 61 to gates 59-4 and 59-5 and through "OR" circuit 63 to gates 59–1, 59–2, and 59–3. "AND" circuit 57 is connected through "OR" circuit 63 to gates 59–1, 59–2, and 59–3. Thus, the output of "AND" circuit 52 will cause gates 59–1 through 59–7 to open if the system is in phase one, or gates 59–1 through 59–5 if the system is in phase two, or gates 59–1 through 59–3 if the system is in phase three. In this manner the contents of the appropriate positions of the target register 32 are transferred to corresponding positions of the output register 64.

Since a match has occurred it is also necessary that the letters in target register 32 and response register 34 which match should now be replaced by used characters. If the system was in phase one, the letters in positions R1 through R7 of register 34 and T1 through T7 of register 32 should be replaced by "used" characters. If the system was in phase two, the letters and R1 through R–5 of register 34 and T1 through T5 of register 32 should be replaced by "used" characters. If the system was in phase three, the letters and positions R1 through R3 of register 34 and T1 through T3 of register 32 should be replaced by "used" characters. This is instituted by pulse CL–13 produced by single shot circuit 56 being triggered by the output of "AND" circuit 56. Pulse CL–13 is applied to "AND" circuits 260, 262, and 264 (FIG. 3D). "AND" circuit 260 also is coupled to the phase one lead 78–1 of phase counter 78. "AND" circuit 262 is coupled to phase two lead 78–2 of phase counter 78, and "AND" circuit 264 is coupled to the phase three lead 78–3 of phase counter 264.

Assuming that the system is in phase one when pulse CL–13 is generated, "AND" circuit 260 will be gated and the output therefrom will be applied directly to a gate 266, through "OR" circuit 268 to a gate 270 and through an "OR" circuit 272 to a gate 274. Gates 266, 270, and 274 have their inputs connected to a "used" character generator which provides a coded signal which is the "used" character. The output of gate 266 is applied to positions R6 and R7 of register 34 and positions T6 and T7 of register 32. The output of gate 270 is applied to positions R4 and R5 of register 34, and positions T4 and T5 of register 32. The output of gate 274 is connected to the positions R1, R2, and R3 of register 34, and positions T1, T2, and T3 of register 32. Thus, if the system is in phase one, all of the gates 266, 270, and 274 are gated and used characters are entered into positions R1 through R7 of register 34 and positions T1 through T7 of register 32. If the system is in phase two, the output of "AND" circuit 262 is coupled through "OR" circuit 268, and 272, and only gate circuits 270 and 274 are enabled. Thus, only the first five positions of the register 32 and 34 receive used characters. Likewise, if the system is in phase three, the output of "AND" circuit 264 is coupled only through "OR" circuit 272 to gate 274. Thus, "used" characters are entered only in positions R1 through R3 of register 34 and positions T1 through T3 of register 32. After a given time, single shot circuit 56 turns off and pulse CL–13 ends. In turning off, single shot circuit 56 generates a momentary pulse SS–13.

Now that the matched letters have been entered into the output shift register and replaced by "used" characters in the student response register 34 and target register 32, the function of pulse SS–13 is to shift the used characters out of both the target register 32 and the response register 34, so that a new match can be attempted, and to shaft the output register a like amount. If the system is in phase one, the registers should be shifted seven positions. If the system is in phase two the registers should be shifted five positions; and if the system is in phase three the registers should be shifted three positions. Thus, pulse SS–13 is applied to three "AND" circuits 276, 278, and 280 (FIG. 3D). "AND" circuit 276 is also connected to phase one lead 78–1 of phase counter 78, AND circuit 278 is also connected to the phase two lead 78–2 of phase counter 78, and "AND" circuit 280 is also connected to the phase three lead 78–3 of phase counter 78.

If the system is in phase one, "AND" circuit 276 will be enabled; if the system is in phase two, "AND" circuit 278 will be enabled and if the system is in phase three, "AND" circuit 280 will be enabled during the duration of pulse SS–13.

The output of "AND" circuit 276 is connected as an input trigger signal to a single shot circuit 282. The output of "AND" circuit 278 is applied as an input trigger signal to a single shot circuit 284, and the output of "AND" circuit 280 is applied as an input trigger signal to a single shot circuit 286. Single shot circuit 282, when triggered, produces an output pulse CL–14 which is connected to a shift pulse generator 288 (FIG. 3B), which generates seven shift pulses which are coupled through "OR" circuit 62 and shifts the target register 32 seven positions forward. Pulse CL–14 is also connected at an input signal to a shift pulse generator 290 (FIG. 3F) which produces seven shift pulses which are connected through "OR" circuit 166, into response register 34 which shifts the response register 34 seven positions forward.

Single shot circuit 284, when triggered, produces an output pulse CL–15 which is connected as an input signal to a shift pulse generator 292 (FIG. 3B) which produces five shift pulses which are coupled through "OR" circuit 62 and causes target register 32 to shift five positions forward. Pulse CL–15 is also connected as an input signal to a shift pulse generator 294 which also produces five shift pulses, which are connected through "OR" circuit 166 to response register 34 and causes response register 34 to shift five positions forward.

Single shot circuit 286, when triggered, produces an output pulse CL–16 which is connected as an input signal to a shift pulse generator 296, which produces three shift pulses which are connected through "OR" circuit 262 to shift the target register 32 three positions forward. Pulse CL–16 is also connected as an input signal to a shift pulse generator 298 which produces three shift pulses which are connected through "OR" circuit 166 to response register 34 and caused response register 34 to be shifted three positions forward. Thus, depending upon the phase which the system happens to be in, the target register and response register are shifted the proper amount. It is to be noted that the output of "OR" circuit 62 is also connected as an input shift control to output shift register 64, thus, output register 64 is shifted the same amount as the response register 34 and the target register 32. When shift register 282 turns off, it generates a momentary pulse SS–14. When shift register 284 turns off it generates a momentary pulse SS–15; and when shift register 286 turns off, it generates a momentary pulse SS–16. Pulses SS–14, SS–15, and SS–16 are connected as inputs through an "OR" circuit 300 to a single shot circuit 302. Single shot circuit 302, when triggered, produces a pulse CL–17.

As previously described, the target register 32, the response register 34, and the output register 64 have been advanced a selected number of positions by the generation of either pulse CL–14, pulse CL–15, or pulse CL–16, thereby entering a new field into the target register 32 and the response register 34. It is possible that the new field enter into the target register 32 or the response register 34 contains a special "used" character and, in such case, it must be shifted out of the field.

If the target register 32 contains a special "used" character in the field, it will be detected by "used" character decoder 76 and, as previously described, an output signal will ultimately be passed through "OR" circuit 102 to "AND" circuit 74. Pulse CL–17 from single shot circuit 302 therefore is applied as an input signal to flip-flop 71 which triggers and applies a single through "OR" circuit 72. Thus, if a "used" character is present in the field of target register 32, an output signal will be produced from "AND" circuit 74, causing shift register 104 to turn on and produce a series of shift pulses. The shift pulses will cause the target register 32 to continue to shift. At the time when the "used" characters are shifted out of the field of the target register 32, no further signal will be generated by used character decoder 76 and no signal will be passed through "OR" circuit 102, thus, "AND" circuit 74 becomes disabled and shift pulse generator 104 turns off. Likewise, the output or OR circuit 102 is inverted by inverter 106 and applied to an "AND" circuit 134 along with the lead from flip-flop 71. The output of "AND" circuit 134 is employed to reset flip-flop 70 to its initial state. When flip-flop 71 is reset, it applies a signal to trigger pulse generator 73 which generates a momentary pulse which is coupled to "AND" circuits 140 and 134. The other inputs to "AND" circuits 140 and 134 are from leads 132 and 130 from the "target answer at an end" flip-flop 26. If the target answer has ended, there will be a signal on lead 130 but if the target answer has not ended, there will be a signal on lead 132. Thus, if the target answer has ended, "AND" circuit 134 will be enabled; but if the target answer has not ended, "AND" circuit 140 will be enabled. If the target answer has ended, it is desired to return to Step One. Thus, the output of "AND" circuit 134 is connected back through "OR" circuit 20 as an input trigger signal to single shot circuit 22, which in turn generates pulse CL-1. If the target answer has not ended, "AND" circuit 140 will produce an output pulse which is connected through an "OR" circuit 310 as an input trigger signal to a single shot circuit 312.

Single shot circuit 312 when triggered produces an output pulse CL-18. Output pulse CL-18 provides for the same function for the response register 34 as pulse CL-17 provided for target register 32; that is, pulse CL-18 triggers a flip-flop 173 which in turn applies a signal through "OK" circuit 174 to "AND" circuit 176. If there are any used characters in the field of response register 34, thus providing an output from "OR" circuit 204 to "AND" circuit 176, "AND" circuit 176 will be enabled and an input signal applied to shift register 206 which continues to produce a series of shift pulses causing response register 34 to shift forward. When the used characters are no longer in the field of response register 34, the output signal from "OR" circuit 204 will cease and "AND" circuit 176 will be disabled and shift pulse generator 206 will turn off. The lack of an output signal from "OR" circuit 204 produces an output signal from inverter circuit 208 which is applied to "AND" circuit 211 along the lead from flip-flop 173. The output signal from "AND" circuit 211 resets flip-flop 173. When reset, flip-flop 173 triggers a pulse generator 175 which provides an output pulse to "AND" circuits 320 and 322. "AND" circuit 320 is also connected to lead 228 which will have a signal thereon if the student response has not ended. "AND" circuit 322 is also connected to lead 226 which will have a signal thereon if the student response has come to an end. If the student response has come to an end, "AND" circuit 322 is gated by the pulse from pulse generator 175 and produces an output signal which is connected through "OR" circuit 120 to trigger single shot circuit 122. Single shot circuit 122 when triggered produces an output pulse CL-12 as previously described, which causes the phase counter 78 to advance one phase. When single shot circuit 122 turns off, the momentary pulse SS-12 therefrom is connected back through "OR" circuit 20 to trigger single shot circuit 22 and generate pulse CL-1 (Step One).

If, on the other hand, the student response has not come to an end, "AND" circuit 320 will be gated and an output signal therefrom will be applied to a single shot circuit 324, which when triggered, produces an output pulse CL-19. The function of pulse CL-19 is to determine if the student response has come to an end. Thus, just as pulse CL-9, pulse CL-19 is coupled through "OR" circuit 220 to an "AND" circuit 222. If the student response has come to an end, an "end" character will be present in position R1 of register 34, and special "end" character decoder 224 will produce an output signal thereby gating "AND" circuit 222 and causing flip-flop 24 to change state, providing an output signal on lead 226 indicating that the student response has come to an end.

If, however, the student response has not come to an end, there will be no special "end" character in position R1 of register 34, and there will be no output signal provided from special "end" character decoder 224. Therefore, "AND" circuit 222 will not be gated, the flip-flop 24 will remain in its "response not at an end" state and a signal will continue to be provided on lead 228. After a given time, single shot circuit 324 turns off and pulse CL-19 ceases. In turning off, single shot circuit 324 produces a momentary pulse SS-19 which is connected as an input signal to "AND" circuits 326 and 328. "AND" circuit 326 is also connected to lead 228 from flip-flop 24 and will be gated if the student response has not ended. "AND" circuit 328 is also connected to lead 226 from flip-flop 24 and will be gated in the event that the student response has ended. The output from "AND" circuit 326 is connected as an input trigger signal to a single shot circuit 330. The output from "AND" circuit 328 is connected through "OR" circuit 332 as an input signal to single shot circuit 334 (FIG. 3G).

Single shot circuit 330, when triggered, produces an output pulse CL-20. Single shot circuit 324, when triggered, produces an output pulse CL-21. Thus, pulse CL-20 will be generated if the student response has not ended, and pulse CL-21 will be generated if the student response has ended. The function of pulse CL-20 is to test to see if the target answer has come to an end, and thus is applied through "OR" circuit 124 to "AND" circuit 126 (FIG. 3B). If the target answer has come to an end, there will be a special "end" character present in position T1 of target register 32. An output signal will therefore be produced by special "end" character decoder 128 and "AND" circuit 126 will be gated, thereby applying a trigger signal to flip-flop 26 causing a signal to be produced on lead 130, which indicates that the target answer has come to an end. If, on the other hand, the target answer has not come to an end, there will be no special "end" character present in position T1 of target register 32 and consequently there will be no output signal from special "end" character decoder 128. Therefore, "AND" circuit 126 will not be gated, flip-flop 26 will remain in its "target answer not at an end" state and a signal will be present on output lead 132. After a given time, single shot circuit 330 turns off and pulse CL-20 ends. In turning off, single shot circuit 330 produces a momentary pulse SS-20 which is applied as an input signal to "AND" circuits 144 and 138. "AND" circuit 138 is also connected to lead 130 from flip-flop 26 and "AND" circuit 144 is also connected to lead 132 from flip-flop 26. Thus, if the target answer has not ended, "AND" circuit 144 will be gated and an output signal therefrom will be applied back through "OR" circuit 20 to single shot circuit 22 to again generate the initial pulse CL-1. If the target answer has come to an end, a signal will be present on lead 130 and "AND" circuit 138 will be gated producing an output signal which is applied through "OR" circuit 332 to trigger single shot circuit 334 and produce pulse CL-21.

Thus, to review, the response was tested to see if it had come to an end by pulse CL-19; if the response had come to an end, pulse CL-21 would have been immediately generated. If the response had not come to an end, pulse CL-20 would have been generated to determine if the target answer had come to an end. If the target answer had not come to an end, pulse CL-1 would be generated; but if the target answer had come to an end, then pulse CL-21 is generated by the triggering of single shot circuit 334.

The function of pulse CL-21 is to return the target register 32 to its home position; that is, to shift the contents of the target register backward until a special "end" character appears in position TH. In this respect pulse CL-21 functions the same as pulse CL-6 previously described. Pulse CL-21 is employed to trigger a flip-flop 149 to its "on" state. The output of flip-flop 149 is transmitted through "OR" circuit 148 to "AND" circuit 150. Special "end" character decoder 152 is connected to position TH of the target register 32. The output of special "end" character decoder 152 is applied through an inverter to "AND" circuit 150. Thus, "AND" circuit 150 is gated in the event that no special end character is present in the position TH of the target register 32. The output of "AND" circuit 150 is applied as a trigger signal to shift pulse generator 156 which produces a series of shift pulses which shifts the target register 32 backward or to the right. When a special "end" character is finally shifted into position TH, an output signal is provided to special "end" character decoder 152 which then produces an output signal which when inverted by inverter circuit 154 disables "AND" circuit 150, which thereby turns off shift pulse generator 156. The output of special end character decoder 152 is also connected to flip-flop 149 as a reset pulse. Flip-flop 149, when reset, triggers a pulse generator 151 which produces a momentary pulse which is applied to "AND" circuits 340 and 342 (FIG. 3H). The input of "AND" circuit 340 is also connected to lead 228 of flip-flop 24, and the input of "AND" circuit 342 is also connected to lead 226 from flip-flop 24. Flip-flop 24 is the "response at an end" flip-flop and if the response has ended, a signal will be present on lead 226, thereby gating "AND" circuit 342. But if the response has not ended a signal will be present on the 228 thereby gating "AND" circuit 340. The output signal from "AND" circuit 340 is applied through "OR" circuit 300 as an input trigger signal to single shot circuit 302, thereby generating pulse CL-17, the effect of which has already been described.

If the student response has ended, "AND" circuit 342 will be gated instead, and the output signal therefrom applied to a single shot circuit 344 (FIG. 3G), which when triggered produces an output signal CL-22 which is applied to "AND" circuits 346 and 348 (FIG. 3D). The other input to "AND" circuit 346 comes from inverter circuit 238 which is in turn connected to the phase three lead 78–3 of the phase counter 78. The other input to "AND" circuit 348 comes directly from the phase three lead 78–3 of phase counter 78. Thus, if the system is in phase three a signal will be present on the phase three lead from phase counter 78, thereby enabling "AND" circuit 348. The output from "AND" circuit 348 is applied through "OR" circuit 240 to trigger single shot circuit 242, which, as described, produces an output pulse CL-10 which ends the sequence and causes the output register 64 to read-out to the presentation means.

If the system is not in phase three, an output signal will be generated by the inverter circuit 238 and thereby will gate "AND" circuit 346. The output signal from "AND" circuit 346 is applied as an input trigger signal to a single shot circuit 350 (FIG. 3G). Single shot circuit 350 when triggered produces an output pulse CL-23. Output pulse CL-23 performs the function of homing the response register 34; that is, it shifts the response register 34 until a special "end" character is present in position RH. In this respect, pulse CL-23 is similar to pulse CL-11 previously described. Pulse CL-23 triggers a flip-flop 351 (FIG. 3F) which in turn applies a signal through "OR" circuit 246 as an input to "AND" gate 248. A special "end" character decoder 250 is connected to position RH of the response register 34. The output of special end character decoder 250 is applied through an inverter circuit to "AND" circuit 248. Thus, "AND" circuit 248 will be gated as long as there is no special "end" character present in position RH of pulse response register 34. The output of "AND" circuit 248 is applied as an input signal to shift pulse generator 254 which produced a series of shift pulses which caused response register 34 to shift backwards, or to the right. When an "end" character finally is present in position RH of response register 34, an output signal will be generated by special "end" character decoder 250.

The output from special "end" character decoder 250 is inverted by inverter circuit 252 causing "AND" circuit 248 to be degated. Shift pulse generator 254 therefor turns off. The student response is now in its home position in response register 34. The output signal from special "end" character decoder 250 is also as connected to flip-flop 351 as a reset pulse. Flip-flop 351, when reset, triggers pulse generator 353 which produces a momentary pulse which is applied through "OR" circuit 310 to trigger single shot circuit 312, which in turn produces pulse CL-18. The effect of pulse CL-18 has been previously described.

The system shown in the FIGS. 3A through 3H has now been fully explained. It has been described how the system carries out the steps set forth in the previous discussion. The pulses labeled CL-1, CL-2, CL-3, etc. are equivalent to the steps set forth as Step One, Step Two, Step Three, etc.

What has been described is an automated teaching system wherein the actual responses of the student are employed to synthesize future system presentations. The result is a versatile system which is not confined to a preplanned or pre-programmed routine. The described embodiment related to the teaching of the German language and included a sequence of steps wherein comparisons were made on various lengths of letters in three phases. It should be understood that the present invention may be employed in other diverse fields, such as chemistry, history, mathematics, etc. Also, many variations in the logical sequence may be made within the spirit of the invention, the described sequence being presented only by way of example.

The particular embodiment shown in figures is also offered as an example. One skilled in the art will appreciate that many different arrangements may be provided to embody the present invention and the scope of the invention should not be limited by the described circuits. Since the described circuit components or their equivalents are incorporated in general purpose computers, it would be most advantageous to employ a general purpose computer as the embodiment of the invention. With proper programming, the objects of the present invention may be carried out with computer assistance and the described principles may be enhanced by the advantages provided by the computer. For example, the synthesized reply could be combined with pre-stored information in the computer memory, or else the synthesized reply could be used within the computer as an element of strategy, that is, to determine the selection of branching logic within a predetermined overall discipline.

While the invention has been particularly shown and described with reference to a preferred embodiment thereof, it will be understood by those skilled in the art that various changes in form and details may be made therein without departing from the spirit and scope of the invention.

What is claimed is:

1. A tutorial system for producing synthesized information comprising:
   information storage means containing a first plurality of given increments of data arranged in a first given sequence;
   means for providing a second plurality of selected increments of data arranged in a selected sequence;
   means responsive to said first given increments of data arranged in said first given sequence in said storage means and to said selected increments of data arranged in said selected sequence for comparing said first given increments of data with said selected increments of data for synthesizing a sequence of data increments including particular ones of said first given increments of data, said particular ones of said first given increments of data in said synthesized sequence being determined by said selected increments of data which compare with said first given increments of data.

2. A tutorial system for producing synthesized information comprising:

information storage means containing a first plurality of given increments of data arranged in a first given sequence;

means for providing a second plurality of selected increments of data arranged in a selected sequence;

comparing means responsive to said first given increments of data arranged in said first given sequence in said storage means and to said selected increments of data arranged in said selected sequence for comparing said first given increments of data with said selected increments of data;

means responsive to said compared data increments from said comparing means for synthesizing a sequence of data increments including particular ones of said first given increments of data, said particular ones of said first given increments of data in said synthesized sequence being determined by said selected increments of data which compare with said first given increments of data in said comparing means.

3. A tutorial system for producing synthesized information comprising:

information storage means containing a first plurality of given increments of data arranged in a first given sequence;

means for providing a second plurality of selected increments of data arranged in a selected sequence;

comparing means responsive to said first given increments of data arranged in said first given sequence in said storage means and to said selected increments of data arranged in said selected sequence for comprising said first given increments of data with said selected increments of data, said comparing means comprising;

a first storage device for storing said first given data increments arranged in said first given sequence from said information storage means, a second storage device for storing said selected increments of data arranged in said selected sequence.

means connected to said first and second storage devices for sequentially comparing said first given increments of data from said first storage device with said selected increments of data from said second storage device, a third storage device connected to said comparing means for storing, in the same relative order as in said first given sequence, said first given increments of data which match said selected increments of data and for replacing in said first given sequence each non-matching ones of said first given increments of data with a unique increment;

means responsive to said compared data increments from said comparing means for synthesizing a sequence of data increments including particular ones of said first given increments of data, said particular ones of said first given increments of data in said synthesized sequence being determined by said selected increments of data which compare with said first given increments of data in said comparing means.

4. A tutorial system according to claim 3, wherein said comparing means concurrently compares predetermined numbers of said first given increments of data from said first storage device with the same predetermined numbers of said selected increments of data from said second storage device, and wherein all of said predetermined number of first given increments of data must be the same as all of said predetermined number of selected increments of data in order to be a match.

5. A tutorial system for processing and presenting synthesized information comprising:

information storage means containing a first plurality of given increments of data arranged in a first given sequence and a second plurality of given increments of data arranged in a second given sequence;

presentation means responsive to said storage means for presenting said first given sequence of given data increments to a student;

response means for providing a constructed response from said student in the form of selected increments of data arranged in a selected sequence;

combining means responsive to said second given increments of data arranged in said second given sequence in said storage means and to said selected increments of data arranged in said selected sequence provided by said response means for comparing said second given increments of data with said selected increments of data for synthesizing a sequence of data increments including particular ones of said second given increments of data, said particular ones of said second given increments of data in said synthesized sequence being determined by said selected increments of data which compare with said second given increments of data;

and means coupling said combining means to said presentation means for presenting to a student said synthesized sequence including particular ones of said second given increments of data in the same sequence in which said second given increments of data with which they compare are arranged in said second given sequence.

6. A tutorial system for processing and presenting synthesized information comprising:

information storage means containing a first plurality of given increments of data arranged in a first given sequence and a second plurality of given increments of data arranged in a second given sequence;

presentation means responsive to said storage means for presenting said first given sequence of given data increments to a student;

response means for providing a constructed response from said student in the form of selected increments of data arranged in a selected sequence;

comparing means responsive to said second given increments of data arranged in said second given sequence in said storage means and to said selected increments of data arranged in said selected sequence provided by said response means for comparing said second given increments of data with said selected increments of data;

processing means responsive to said compared data increments from said comparing means for synthesizing a sequence of data increments including particular ones of said second given increments of data, said particular ones of said second given increments of data in said synthesized sequence being determined by said selected increments of data which compare with said second given increments of data in said comparing means;

and means coupling said processing means to said presentation means for presenting to a student said synthesized sequence including particular ones of said second given increments of data in the same sequence in which said second given increments of data with which they compare are arranged in said second given sequence.

7. A tutorial system according to claim 6, wherein said comparing means includes a first storage device for storing said second given increments of data arranged in said second given sequence from said information storage means:

a second storage device for storing said selected increments of data arranged in said selected sequence from said response means;

means connected to said first and second storage devices for sequentially comparing said second given increments of data from said first storage device with said selected increments of data from said second storage device;

a third storage device connected to said comparing means for storing, in the same relative order as in said second given sequence, said second given increments of data which match said selected increments of data and for replacing in said second given sequence each non-matching ones of said second given increments of data with a unique increment;

and means connected to said third storage means for transferring the contents thereof to said presentation means.

8. A tutorial system according to claim 6 wherein said information storage system has stored therein supplementary data in addition to said first and second plurality of data increments for combining said supplementary data with said synthesized sequence in said presentation means.

9. A tutorial system according to claim 7, wherein said comparing means concurrently compares predetermined numbers of said second given increments of data from said first storage device with the same predetermined numbers of said selected increments of data from said second storage device, and wherein all of said predetermined number of second given increments of data must be the same as all of said predetermined number of selected increments of data in order to be a match.

10. A tutorial system according to claim 8, wherein the predetermined number of said second given increments of data and said selected increments of data may be varied.

11. A tutorial system for processing and presenting synthesized information comprising:

information storage means containing a first plurality of discrete symbols arranged in a first given sequence and a second plurality of discrete symbols arranged in a second given sequence;

presentation means responsive to said storage means for presenting said first given sequence of discrete symbols to a student;

response means for providing a constructed response from said student in the form of selected discrete symbols in a selected sequence;

comparing means including a first storage device coupled to said storage means for storing said second plurality of discrete symbols therefrom arranged in said second given sequence;

a second storage device coupled to said response means for storing said selected discrete symbols therefrom in said selected sequence means connected to said first-second storage devices for sequentially comparing groups of said second plurality of discrete symbols from said first storage device with equal numbered groups of said selected discrete symbols from said second storage device;

a third storage device connected to comparing means for storing said groups of said second plurality of discrete symbols which match said groups of said selected symbols in the order in which said machine discrete symbols are arranged in said second sequence, said third storage device containing unique symbols in said second sequence in place of groups of said discrete symbols which are not matching.

12. A tutorial system according to claim 11 wherein said first plurality of discrete symbols represent alphabetical letters and said first given sequence represents at least one meaningful sentence in a first language:

wherein said second plurality of discrete symbols represent alphabetical letters and said second given sequence represents the equivalent of said first given sequence in a second language;

wherein said discrete symbols in said selected sequence represent alphabetical letters in at least one meaningful sentence in said second language.

13. A tutorial system according to claim 11 wherein said discrete symbols represent numerical characters.

References Cited

UNITED STATES PATENTS

| | | | |
|---|---|---|---|
| 2,984,017 | 5/1961 | Pask | 340—172.55 |
| 3,141,243 | 7/1964 | Chapman et al. | 340—172.5 |
| 3,234,522 | 2/1966 | Armstrong et al. | 340—172.5 |

ROBERT C. BAILEY, *Primary Examiner.*

G. D. SHAW, *Assistant Examiner.*

UNITED STATES PATENT OFFICE
CERTIFICATE OF CORRECTION

Patent No. 3,371,321　　　　　　　　　　February 27, 1968

Edward N. Adams

It is certified that error appears in the above identified patent and that said Letters Patent are hereby corrected as shown below:

Column 17, line 64, for "shaft" read -- shift --; column 18, line 60, for "enter" read -- entered --; column 19, line 5, for "or" read -- of --; column 23, lines 33 and 34, for "comprising" read -- comparing --.

Signed and sealed this 15th day of July 1969.

(SEAL)
Attest:

Edward M. Fletcher, Jr.
Attesting Officer

WILLIAM E. SCHUYLER, JR.
Commissioner of Patents